US010096330B2

(12) United States Patent
Kohmura et al.

(10) Patent No.: US 10,096,330 B2
(45) Date of Patent: Oct. 9, 2018

(54) UTTERANCE CONDITION DETERMINATION APPARATUS AND METHOD

(71) Applicant: FUJITSU LIMITED, Kawasaki-shi, Kanagawa (JP)

(72) Inventors: Sayuri Kohmura, Kawasaki (JP); Taro Togawa, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/247,887

(22) Filed: Aug. 25, 2016

(65) Prior Publication Data

US 2017/0061991 A1 Mar. 2, 2017

(30) Foreign Application Priority Data

Aug. 31, 2015 (JP) ................................ 2015-171274

(51) Int. Cl.
*G10L 17/00* (2013.01)
*G10L 21/00* (2013.01)
*G10L 25/63* (2013.01)
*G10L 25/78* (2013.01)

(52) U.S. Cl.
CPC .............. *G10L 25/63* (2013.01); *G10L 25/78* (2013.01)

(58) Field of Classification Search
None
See application file for complete search history.

(56) References Cited

U.S. PATENT DOCUMENTS 9,685,152 B2 * 6/2017 Matsubara ............ G10L 13/027
9,916,843 B2 * 3/2018 Togawa .................. G10L 25/06
2011/0282662 A1 11/2011 Aonuma et al.
(Continued)

FOREIGN PATENT DOCUMENTS

JP 2007-286097 11/2007
JP 2010-175684 8/2010
(Continued)

OTHER PUBLICATIONS

Extended European Search Report dated Jan. 11, 2017 for corresponding European Patent Application No. 16181232.6, 7 pages.
(Continued)

*Primary Examiner* — Satwant Singh
(74) *Attorney, Agent, or Firm* — Fujitsu Patent Center

(57) ABSTRACT

An utterance condition determination device includes a memory configured to a voice signal of a first speaker and a voice signal of a second speaker, and a processor configured to estimate an average backchannel frequency that represents a backchannel frequency of the second speaker in a period of time from a voice start time of the voice signal of the second speaker to a predetermined time based on the voice signal of the first speaker and the voice signal of the second speaker, to calculate the backchannel frequency of the second speaker for each unit of time based on the voice signal of the first speaker and the voice signal of the second speaker, and to determine a satisfaction level of the second speaker based on the estimated average backchannel frequency and the calculated backchannel frequency.

19 Claims, 27 Drawing Sheets

(56) References Cited

U.S. PATENT DOCUMENTS

| | | | | |
|---|---|---|---|---|
| 2013/0253924 | A1 | 9/2013 | Ichimura et al. | |
| 2015/0371662 | A1* | 12/2015 | Togawa | G10L 25/48 704/205 |

FOREIGN PATENT DOCUMENTS

| | | | |
|---|---|---|---|
| JP | 2011-238028 | A | 11/2011 |
| JP | 2013-200423 | | 10/2013 |
| JP | 2013-225003 | | 10/2013 |

OTHER PUBLICATIONS

Schuller, Bjorn et al.,"Paralinguistics in speech and language-State-of-the-art and the challenge", Computer Speech and Language., vol. 27, No. 1, Jan. 1, 2013, pp. 4-39, XP055331538.

Speech 1,,"Speech 1", [online], [Retrieved on Aug. 29, 2015], Internet <URL:http://media.sys.wakayama-u.ac.jp/kawahara-lab/LOCAL/diss/diss7/S3_6_htm> (28 pages).

* cited by examiner

| v(m) | w(m) |
|---|---|
| 0 | PERSON AT THE OTHER END FEELS DISSATISFIED. |
| 1 | PERSON AT THE OTHER END IS SATISFIED. |

FIG. 8

| V | w(m) |
|---|---|
| 0～20 | PERSON AT THE OTHER END FEELS DISSATISFIED. IMPROVE YOUR RESPONSE. |
| 21～40 | PERSON AT THE OTHER END FEELS SOMEWHAT DISSATISFIED. LISTEN TO WHAT PERSON AT THE OTHER END SAYS. |
| 41～60 | NO BIG PROBLEMS FOUND. TRY TO MAKE BETTER RESPONSE. |
| 61～80 | PERSON AT THE OTHER END IS SATISFIED. |
| 81～100 | PERSON AT THE OTHER END IS QUITE PLEASED. |

FIG. 14

| VOWEL TYPE | RISING PITCH | FALLING PITCH |
|---|---|---|
| /a/ | AFFIRMATIVE | NEGATIVE |
| /i/ | NEGATIVE | AFFIRMATIVE |
| /u/ | AFFIRMATIVE | NEGATIVE |
| /e/ | NEGATIVE | AFFIRMATIVE |
| /o/ | AFFIRMATIVE | NEGATIVE |
| /N/ | NEGATIVE | AFFIRMATIVE |

FIG. 20

| SPEECH RATE r | AVERAGE BACKCHANNEL FREQUENCY JD |
|---|---|
| 0.0≦ r <1.0 | 0.3 |
| 1.0≦ r <2.0 | 0.4 |
| 2.0≦ r | 0.5 |

FIG. 21

545a

| TIME $T_{sum}$ | AVERAGE BACKCHANNEL FREQUENCY JE |
|---|---|
| $0 \leqq T_{sum} < 10$ | 0.3 |
| $10 \leqq T_{sum} < 20$ | 0.4 |
| $20 \leqq T_{sum}$ | 0.5 |

FIG. 25

UTTERANCE CONDITION DETERMINATION APPARATUS AND METHOD

CROSS-REFERENCE TO RELATED APPLICATION

This application is based upon and claims the benefit of priority of the prior Japanese Patent Application No. 2015-171274, filed on Aug. 31, 2015, the entire contents of which are incorporated herein by reference.

FIELD

The embodiments discussed herein are related to an utterance condition determination apparatus.

BACKGROUND

As a technology to estimate an emotional condition of each speaker in a voice call, a technology has been known such that whether or not a speaker (an opposing speaker) is in a state of anger is determined by using the number of backchannel feedback of the speaker (see Patent Document 1 as an example).

As a technology to detect an emotional condition of a speaker (an opposing speaker) during a voice call, a technology has been known such that whether or not the speaker is in a state of excitement is detected by using intervals of backchannel utterance etc. (see Patent Document 2 as an example).

In addition, as a technology to detect backchannel feedbacks from voice signals, a technology has been known such that an utterance section of a voice signal is compared with backchannel data registered in a backchannel feedback dictionary and a section in the utterance section that matches the backchannel data is detected as a backchannel section (see Patent Document 3 as an example).

Moreover, as a technology to record a conversation between two people by a voice call etc., and to reproduce a recorded data of the conversation (the voice call) after the conversation is ended, a technology has been known such that a reproduction speed is changed in accordance with an speech rate of a speaker (see Patent Document 4 as an example).

Furthermore, it has been known that vowels can be used as a feature amount of a voice of a speaker (see Non-Patent Document 1 as an example).

Patent Document 1: Japanese Laid-open Patent Publication No. 2010-175684

Patent Document 2: Japanese Laid-open Patent Publication No. 2007-286097

Patent Document 3: Japanese Laid-open Patent Publication No. 2013-225003

Patent Document 4: Japanese Laid-open Patent Publication No. 2013-200423

Non Patent Document 1: "Onsei (voice) 1", [online], [searched on Aug. 29, 2015], the Internet<URL:http://media.sys.wakayama-u.ac.jp/kawahara-lab/LOCAL/diss/diss7/S3_6.htm>

SUMMARY

According to an aspect of the embodiment, an utterance condition determination device includes a memory configured to a voice signal of a first speaker and a voice signal of a second speaker, and a processor configured to estimate an average backchannel frequency that represents a backchannel frequency of the second speaker in a period of time from a voice start time of the voice signal of the second speaker to a predetermined time based on the voice signal of the first speaker and the voice signal of the second speaker, to calculate the backchannel frequency of the second speaker for each unit of time based on the voice signal of the first speaker and the voice signal of the second speaker, and to determine a satisfaction level of the second speaker based on the estimated average backchannel frequency and the calculated backchannel frequency.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 8 is a diagram providing an example of sentences stored in the storage unit;

FIG. 14 is a diagram providing an example of sentences stored in the storage unit;

FIG. 20 is a diagram providing an example of the backchannel intension determination information;

FIG. 21 is a diagram providing an example of the correspondence table of the speech rate and the average backchannel frequency;

FIG. 25 is a diagram providing an example of a correspondence table of an average backchannel frequency;

DESCRIPTION OF EMBODIMENTS

Preferred embodiments of the present invention will be explained with reference to accompanying drawings.

Estimation (determination) of whether or not a speaker is in a state of anger or in a state of dissatisfaction uses a relationship between an emotional condition and a way of giving backchannel feedback of the speaker. More specifically, the number of times of backchannel feedbacks is fewer when the speaker is angry or is dissatisfied than when the speaker is in a normal condition. Therefore, the emotional condition of the opposing speaker can be determined on the basis of the number of times of backchannel feedbacks as an example and a certain threshold prepared in advance.

However, because of individual variation in the number and interval of backchannel feedback, it is difficult to determine the emotional condition of a speaker based on a certain threshold. For example, in a case of a determination target speaker who infrequently gives backchannel feedback by nature, the number of times of backchannel feedbacks may be fewer than the threshold even though the speaker gives backchannel feedback more frequently than in his/her normal condition, and in such a case it is likely that the speaker is determined to be in a state of anger. In another example, in a case of a speaker who frequently gives backchannel feedback by nature, even though the speaker is in a state of anger and the number of times of backchannel feedbacks is fewer than his/her normal condition, it is likely that the speaker is determined to be in a normal condition. In the following description, backchannel feedback may be referred to as simply “backchannel”.

Embodiment 1

Figure 1:
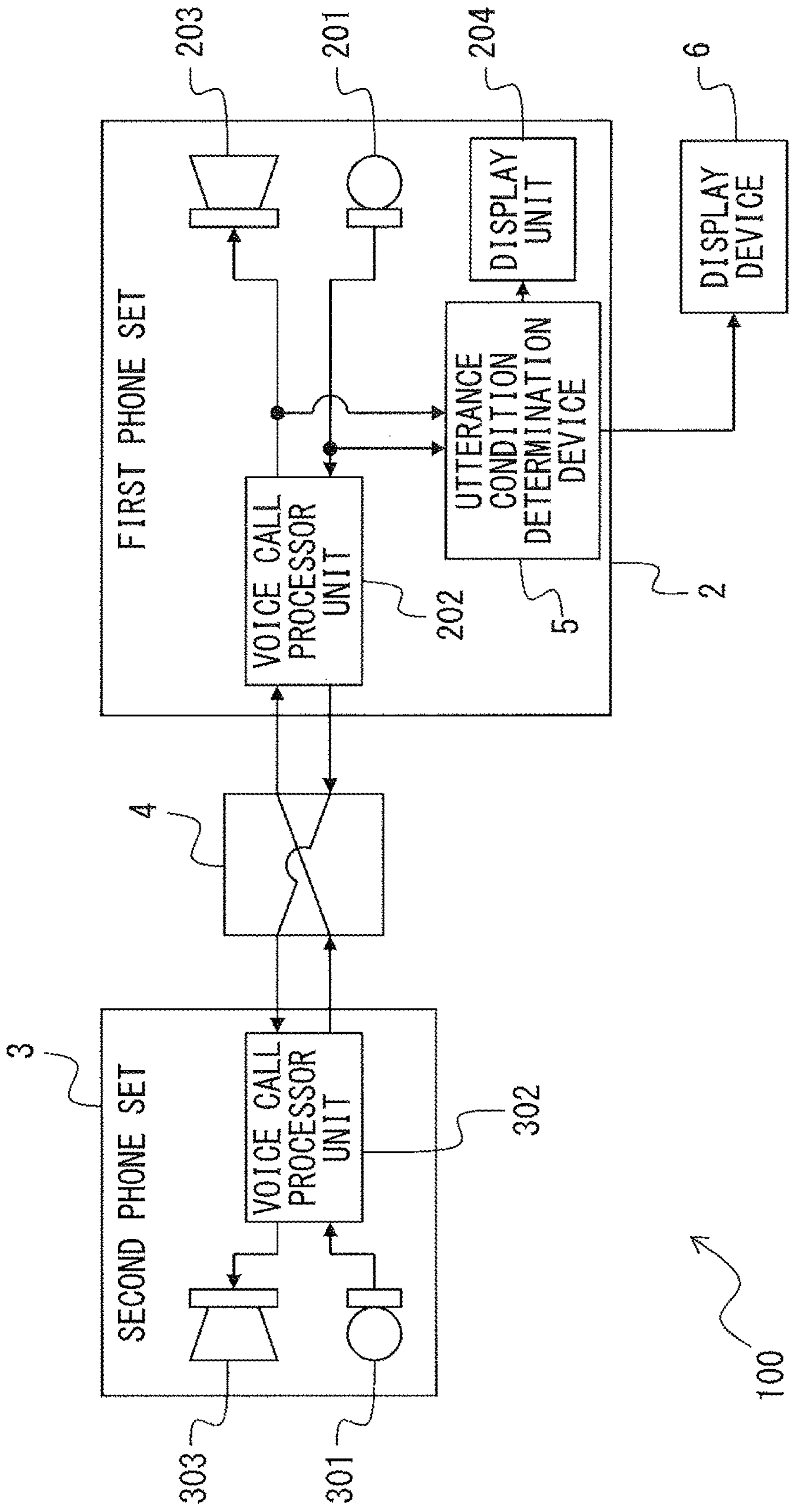
FIG. 1 is a diagram illustrating a configuration of a voice call system according to Embodiment 1.

FIG. 1 is a diagram illustrating a configuration of a voice call system according to Embodiment 1. As illustrated in FIG. 1, a voice call system 100 according to the present embodiment includes the first phone set 2, the second phone set 3, an Internet Protocol (IP) network 4, and a display device 6.

The first phone set 2 includes a microphone 201, a voice call processor 202, a receiver (speaker) 203, a display unit 204, and an utterance condition determination device 5. The utterance condition determination device 5 of the first phone set 2 is connected to the display device 6. Note that the number of the first phone set 2 is not limited to only one, but plural sets can be included.

The second phone set 3 is a phone set that can be connected to the first phone set 2 via the IP network 4. The second phone set 3 includes a microphone 301, a voice call processor 302, and a receiver (speaker) 303.

In this voice call system 100, a voice call with the use of the first and second phone sets 2 and 3 becomes available by making a call connection between the first phone set 2 and the second phone set 3 in accordance with the Session Initiation Protocol (SIP) through the IP network 4.

The first phone set 2 converts a voice signal of a first speaker collected by the microphone 201 into a signal for transmission in the voice call processor 202 and transmits the converted signal to the second phone set 3. The first phone set 2 also converts a signal received from the second phone set 3 into a voice signal that can be output from the receiver 203 in the voice call processor 202 and outputs the converted signal to the receiver 203.

The second phone set 3 converts a voice signal of the second speaker (the opposing speaker of the first speaker) collected by the microphone 301 into a signal for transmission in the voice call processor 302 and transmits the converted signal to the first phone set 2. The second phone set 3 also converts a signal received from the first phone set 2 into a voice signal that can be output from the receiver 303 in the voice call processor 302 and outputs the converted signal to the receiver 303.

The voice call processors 202 and 302 in the first phone set 2 and the second phone set 2, respectively, include an encoder, a decoder, and a transceiver unit, although these units are omitted in FIG. 1. The encoder converts a voice signal (an analog signal) collected by the microphone 201 or 301 into a digital signal. The decoder converts a digital signal received from the opposing phone set into a voice signal (an analog signal). The transceiver unit packetizes digital signals for transmission in accordance with the Real-time Transport Protocol (RTP), while decoding digital signals from a received packet.

The first phone set 2 in the voice call system 100 according to the present embodiment includes the utterance condition determination device 5 and the display unit 204 as described above. In addition, the utterance condition determination device 5 in the first phone set 2 is connected with the display device 6. The display deice 6 is used by another person who is different from the first speaker using the first phone set 2, and another person may be, for example, a supervisor who supervises the responses of the first speaker.

The utterance condition determination device 5 determines whether or not the utterance condition of the second speaker meets the satisfactory condition (i.e., the satisfaction level of the second speaker) based on the voice signals of the first speaker and the voice signals of the second speaker. The utterance condition determination device 5 also warns the first speaker through the display unit 204 or the display device 6 when the utterance condition of the second speaker does not meet the satisfactory condition. The display unit 204 displays the determination result of the utterance condition determination deice 5 (the satisfaction level of the second speaker) and warning etc. Moreover, the display device 6 connected to the first phone set 2 (the utterance condition determination device 5) displays a warning to the first speaker that the utterance condition determination device 5 issues.

Figure 2:
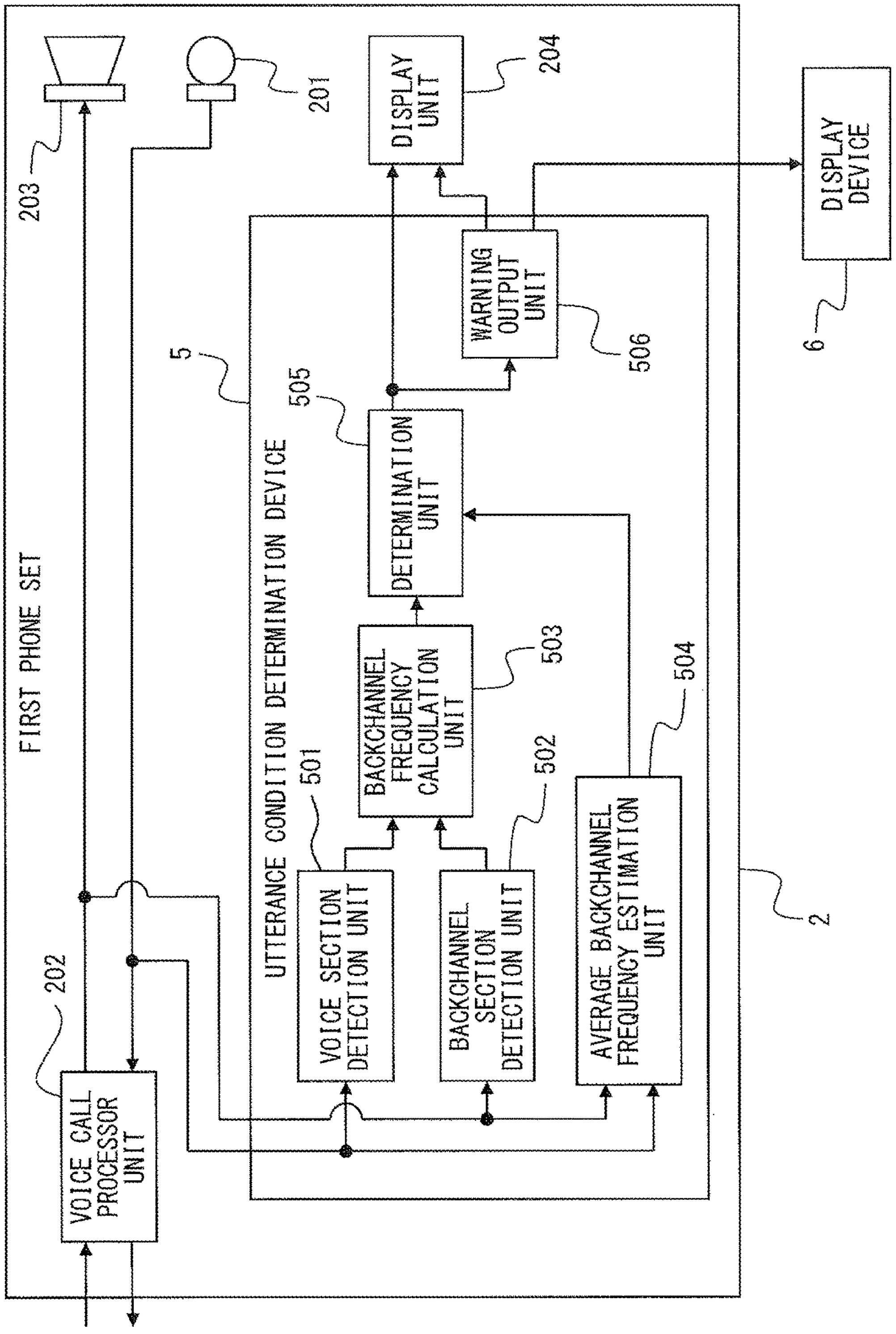
FIG. 2 is a diagram illustrating a functional configuration of the utterance condition determination device according to Embodiment 1.

FIG. 2 is a diagram illustrating a functional configuration of the utterance condition determination device according to Embodiment 1. As illustrated in FIG. 2, the utterance condition determination device 5 according to the present embodiment includes a voice section detection unit 501, a backchannel section detection unit 502, a backchannel frequency calculation unit 503, an average backchannel frequency estimation unit 504, a determination unit 505, and a warning output unit 506.

The voice section detection unit 501 detects a voice section in voice signals of the first speaker. The voice section detection unit 501 detects a section in which the power obtained from a voice signal is at or above a certain threshold TH from among the voice signals of the first speaker as a voice section.

The backchannel section detection unit 502 detects a backchannel section in voice signals of the second speaker. The backchannel section detection unit 502 performs morphological analysis of the voice signals of the second speaker and detects a section that matches any piece of backchannel data registered in a backchannel dictionary that is not illustrated in FIG. 2 as a backchannel section. The backchannel dictionary registers in a form of text data interjections such as "yeah", "I see", "uh-huh", and "wow" that are frequently used as backchannel feedback.

The backchannel frequency calculation unit 503 calculates the number of times of backchannel feedbacks of the second speaker per speech duration of the first speaker as a backchannel frequency of the second speaker. The backchannel frequency calculation unit 503 sets a certain unit of time to be one frame and calculates the backchannel frequency based on the speech duration calculated from the voice section of the first speaker within a frame and the number of times of backchannel feedbacks calculated from the backchannel section of the second speaker.

The average backchannel frequency estimation unit 504 estimates an average backchannel frequency of the second speaker based on the voice signals of the first and second speakers. The average backchannel frequency estimation unit 504 according to the present embodiment calculates an average of the backchannel frequency in a time period in which a prescribed number of frames have elapsed from the voice start time of the voice signals of the second speaker as an estimated value of an average backchannel frequency of the second speaker.

The determination unit 505 determines the satisfaction level of the second speaker, which is in other words, whether or not the second speaker is satisfied, based on the backchannel frequency calculated in the backchannel frequency calculation unit 503 and the average backchannel frequency calculated (estimated) in the average backchannel frequency estimation unit 504.

The warning output unit 506 has the display unit 204 of the first phone set 2 and the display device 6 connected to the utterance condition determination device 5 display a warning when the determinations that the second speaker is not satisfied (i.e., in a state of dissatisfaction) are made a prescribed number of times or more consecutively in the determination unit 505.

Figure 3:
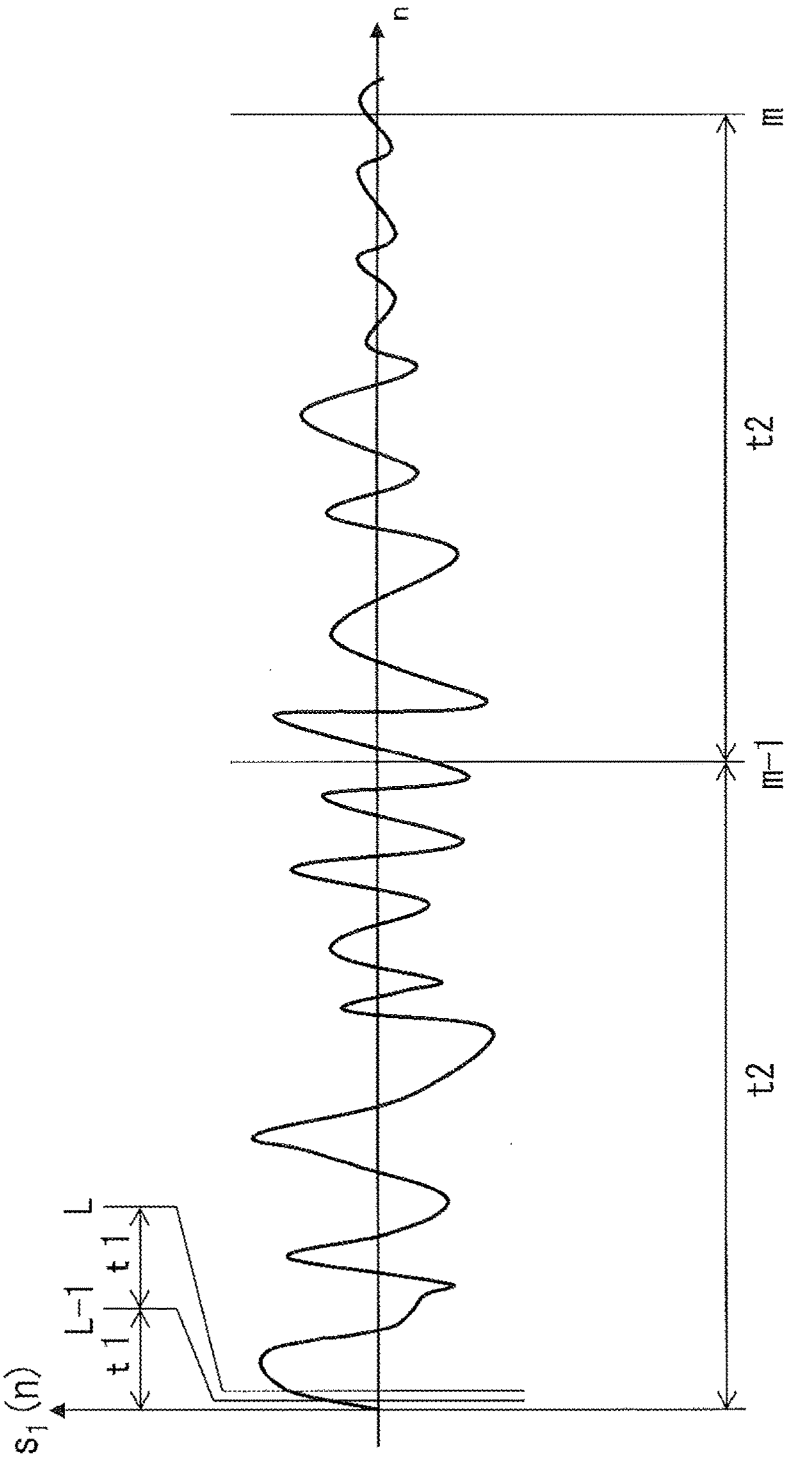
FIG. 3 is a diagram explaining a unit of processing of the voice signal in the utterance condition determination device.

FIG. 3 is a diagram explaining a unit of processing of the voice signal in the utterance condition determination device.

In the detection of a voice section and the detection of a backchannel section in the utterance condition determination device 5, for example, processing for each sample n in the voice signal, sectional processing for every time t1, and frame processing for every time t2 are performed as illustrated in FIG. 3. In FIG. 3, $s_1(n)$ is an amplitude of nth sample in the voice signal of the first speaker. L−1 and L in FIG. 3 represents section numbers, and time t1 that corresponds to one section is 20 msec as an example. In addition, m−1 and m in FIG. 3 are frame numbers, and time t2 that corresponds to one frame is 30 seconds as an example.

The voice section detection unit 501 uses amplitude $s_1(n)$ of each sample in the voice signal of the first speaker and calculates power $p_1(L)$ of the voice signal within the section L by using the following formula (1).

$$p_1(L) = \frac{1}{N}\sum_{i=n-N}^{n} |s_1(i)|^2 \tag{1}$$

In the formula (1), N is the number of samples within the section L.

Next, The voice section detection unit 501 compares the power $p_1(L)$ with a predetermined threshold TH and detects the section L that is power $p_1(L) \geq TH$ as a voice section. The voice section detection unit 501 outputs $u_1(L)$ provided from the following formula (2) as a detection result.

$$u_1(L) = \begin{cases} 1 & (p_1(L) \geq TH) \\ 0 & (p_1(L) < TH) \end{cases} \tag{2}$$

The backchannel section detection unit 502 extracts an utterance section by performing morphological analysis using amplitude $s_2(n)$ of each sample in the voice signal of the second speaker. Next, the backchannel section detection unit 502 compares the extracted utterance section with the backchannel data registered in the backchannel dictionary and detects a section in the utterance section that matches the backchannel data as an utterance section. The backchannel section detection unit 502 outputs $u_2(L)$ provided from the following formula (3) as a detection result.

$$u_2(L) = \begin{cases} 1 & \text{(Backchannel Section)} \\ 0 & \text{(Non-Backchannel Section)} \end{cases} \tag{3}$$

Base on the detection result of the voice section and the detection result of the backchannel section within mth frame, the backchannel frequency calculation unit 503 calculates a backchannel frequency IA (m) provided from the following formula (4).

$$IA(m) = \frac{cntA(m)}{\sum_j (end_j - start_j)} \tag{4}$$

In the formula (4), $start_j$ and $end_j$ is the start time and the end time, respectively, of a section in the voice section in which the detection result $u_1(L)$ is 1. In other words, $start_j$ is a point in time at which the detection result $u_1(n)$ for each sample rises from 0 to 1, and $end_j$ is a point in time at which the detection result $u_1(n)$ for each sample falls from 1 to 0. In the formula (4), cntA(m) is the number of sections in which the detection result $u_2(L)$ in the backchannel section is 1. In other words, cntA(m) is the number of times that the detection result $u_2(n)$ for each sample rises from 0 to 1.

The average backchannel frequency estimation unit 504 calculates an average JA of the backchannel frequency per time unit (one frame) provided from the following formula (5) as an average backchannel frequency by using the backchannel frequency IA(m) in a prescribed number of frames $F_1$ from the voice start time of the second speaker.

$$JA = \frac{1}{F_1}\sum_{m=0}^{F_1-1} IA(m) \tag{5}$$

The determination unit 505 outputs a determination result v(m) based on the criterion formula provided in the following formula (6).

$$v(m) = \begin{cases} 1 & (IA(m) \geq \beta \cdot JA) \\ 0 & (IA(m) < \beta \cdot JA) \end{cases} \tag{6}$$

In the formula (6), v(m)=1 indicates that a person at the other end of the line is satisfied, and v (m)=0 indicates that a person at the other end of the line is dissatisfied. In addition, β in the formula (6) represents a collection coefficient (e.g., β=0.7).

The warning output unit 506 obtains the determination result v(m) of the determination unit 505 and outputs a warning signal when the results v(m)=0 are obtained in two or more consecutive frames. The warning output unit 506 outputs the second determination result e(m) provided from the following formula (7) as an example of the warning signal.

$$e(m) = \begin{cases} 1 & (v(m) = 0 \text{ and } v(m-1) = 0) \\ 0 & \text{(otherwise)} \end{cases} \tag{7}$$

Figure 4:
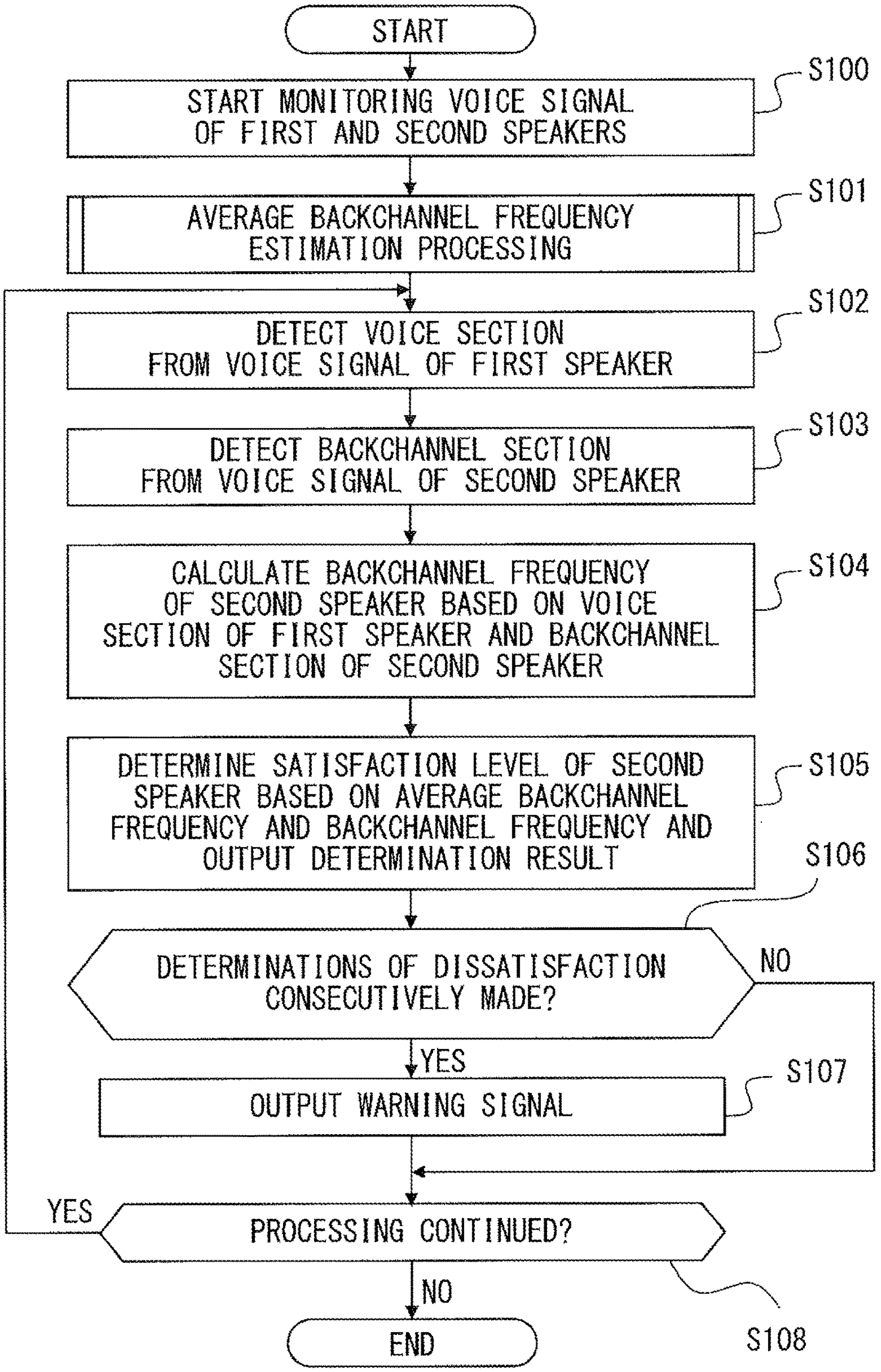
FIG. 4 is a flowchart providing details of the processing performed by the utterance condition determination device according to Embodiment 1.

FIG. 4 is a flowchart providing details of the processing performed by the utterance condition determination device according to Embodiment 1.

The utterance condition determination device 5 according to the present embodiment performs the processing illustrated in FIG. 4 when the call connection between the first phone set 2 and the second phone set 3 is connected, and a voice call becomes available.

The utterance condition determination device 5 starts monitoring the voice signals between the first and second speakers (step S100). Step S100 is performed by a monitoring unit (not illustrated) provided in the utterance condition determination device 5. The monitoring unit monitors the voice signal of the first speaker transmitted from the microphone 201 to the voice call processor 202 and the voice signal of the second speaker transmitted from the voice call processor 202 to the receiver 203. The monitoring unit outputs the voice signal of the first speaker to the voice section detection unit 501 and the average backchannel frequency estimation unit 504 and also outputs the voice signal of the second speaker to the backchannel section detection unit 502 and the average backchannel frequency estimation unit 504.

Next, the utterance condition determination device performs the average backchannel frequency estimation processing (step S101). Step S101 is performed by the average backchannel frequency estimation unit 504. The average backchannel frequency estimation unit 504 calculates a backchannel frequency IA(m) in two frames (60 seconds) from the voice start time of the voice signal of the second speaker by using the formulae (1) to (4) as an example. Afterwards, the average backchannel frequency estimation unit 504 outputs to the determination unit 505 an average JA of the backchannel frequency per one frame calculated by using the formula (5) as an average backchannel frequency.

After calculating the average backchannel frequency JA, the utterance condition determination unit 5 performs processing to detect a voice section from the voice signal of the first speaker (step S102) and processing to detect a backchannel section from the voice signal of the second speaker (step S103). Step S102 is performed by the voice section detection unit 501. The voice section detection unit 501 calculates the detection result $u_1(L)$ of a voice section in the voice signal of the first speaker by using the formulae (1) and (2). The voice section detection unit 501 outputs the detection result $u_1(L)$ of the voice section to the backchannel frequency calculation unit 503. On the other hand, step S103 is performed by the backchannel section detection unit 502. The backchannel section detection unit 502, after detecting a backchannel section by the above-described morphological analysis etc., calculates the detection result $u_2(L)$ of the backchannel section by using the formula (3). The backchannel section detection unit 502 outputs the detection result $u_2(L)$ of the backchannel section to the backchannel frequency calculation unit 503.

Note that in the flowchart in FIG. 4, step S103 is performed after step S102, but this sequence is not limited. Therefore, step S103 may be performed before step S102. Also, step S102 and step S103 may be performed in parallel.

The utterance condition determination device 5, next, calculates the backchannel frequency of the second speaker based on the voice section of the first speaker and the backchannel section of the second speaker (step S104). Step S104 is performed by the backchannel frequency calculation unit 503. The backchannel frequency calculation unit 503 calculates the backchannel frequency IA(m) of the second speaker in the mth frame by using the formula (4). The backchannel frequency calculation unit 503 outputs the calculated backchannel frequency IA(m) to the determination unit 505.

The utterance condition determination device 5 determines the satisfaction level of the second speaker based on the average backchannel frequency JA and the backchannel frequency IA(m) of the second speaker and outputs the determination result to the display unit and the warning output nit (step S105). Step S105 is performed by the determination unit 505. The determination unit 505 calculates a determination result v(m) by using the formula (6) and outputs the determination result v(m) to the display unit 204 and the warning output unit 506.

The utterance condition determination device 5 decides whether or not the determinations that the second speaker is dissatisfied (determinations of dissatisfaction) were consecutively made in the determination unit 505 (step S106). Step S106 is performed by the warning output unit 506. The warning output unit 506 stores a value of the determination result v(m−1) in the m−1th frame and calculates the second determination result e(m) provided from the formula (7) based on v(m) and v(m−1). When e(m)=1, the warning output unit 506 decides that the determinations of dissatisfaction were consecutively made in the determination unit 505.

When the determinations of dissatisfaction were consecutively made in the determination unit 505 (step S106; YES), the warning output unit 506 outputs a warning signal to the display unit 204 and the display device 6 (step S107). On the other hand, when the determinations of dissatisfaction were not consecutively made in the determination unit 505 (step S106; NO), the warning output unit 506 skips the processing in step S107.

Afterwards, the utterance condition determination device 5 decides whether or not the processing is continued (step S108). When the processing is continued (Step S108; YES), the utterance condition determination device 5 repeats the processing in Step S102 and the subsequent steps. When the processing is not continued (step S108; NO), the utterance condition determination device 5 ends the monitoring of the voice signals of the first and second speakers and ends the processing.

Note that while the utterance condition determination device 5 performs the above-described processing, the display unit 204 of the first phone set 2 and the display device 6 display the satisfaction level of the second speaker and other matters. At the time of starting a voice call, the display unit 204 of the first phone set 2 and the display device 6 display that the second speaker does not feed dissatisfied, and the displays in accordance with the determination result v(m) of the determination unit 505 are provided afterward. When the warning signal is output from the warning output unit 506, the display unit 204 of the first phone set 2 and the display device 6 switches the display related to the satisfaction level of the second speaker to a display in accordance with the warning signal.

Figure 5:
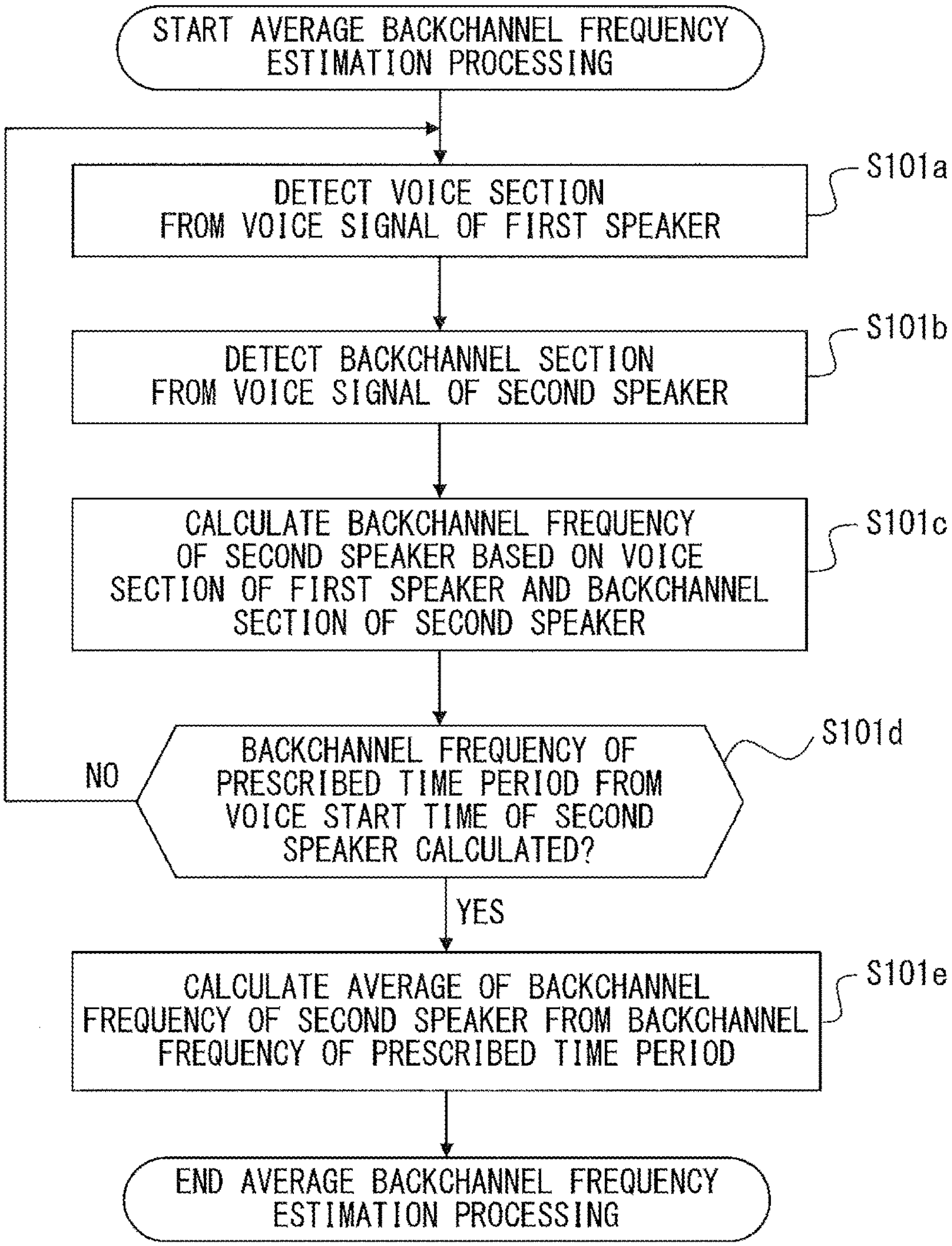
FIG. 5 is a flowchart providing details of the average backchannel frequency estimation processing according to Embodiment 1.

FIG. 5 is a flowchart providing details of the average backchannel frequency estimation processing according to Embodiment 1.

The average backchannel frequency estimation unit 504 of the utterance condition determination device 5 according to the present embodiment performs the processing illustrated in FIG. 5 in the above-described average backchannel frequency estimation processing (step S101).

The average backchannel frequency estimation unit 504 performs processing to detect a voice section from a voice signal of the first speaker (step S101*a*) and processing to detect a backchannel section from a voice signal of the second speaker (step S101*b*). In the processing in step S101*a*, the average backchannel frequency estimation unit 504 calculates a detection result $u_1(L)$ of a voice section in the voice signal of the first speaker by using the formulae (1) and (2). In the processing in step S101*b*, the average backchannel frequency estimation unit 504, after detecting a backchannel section by the above-described morphological analysis etc., calculates a detection result $u_2(L)$ of the backchannel section by using the formula (3).

Note that in the flowchart in FIG. 5, step S101*b* is performed after step S101*a*, but this sequence is not limited. Therefore, step S101*b* may be performed first or step S101*a* and step S101*b* may be performed in parallel.

The average backchannel frequency estimation unit 504, next, calculates a backchannel frequency IA(m) of the second speaker based on the voice section of the first speaker and the backchannel section of the second speaker (step S101*c*). In the processing in step S101*c*, the average backchannel frequency estimation unit 504 calculates a backchannel frequency IA(m) of the second speaker in the mth frame by using the formula (4).

Afterwards, the average backchannel frequency estimation unit 504 checks whether or not the backchannel frequency in a prescribed number of frames $F_1$ from the voice start time of the second speaker is calculated (step S101*d*). When the backchannel frequency in the prescribed number of frames (e.g., $F_1$=2) is not calculated (step S101*d*; NO), the average backchannel frequency estimation unit 504 repeats the processing in steps S101*a* to S101*c*. When the backchannel frequency in the prescribed number of frames is calculated (step S101*d*; YES), the average backchannel frequency estimation unit 504 calculates an average JA of the backchannel frequency of the second speaker from the backchannel frequency in a prescribed number of frames (step S101*e*). In the processing in step S101*e*, the average backchannel frequency estimation unit 504 calculates an average JA of the backchannel frequency per one frame by using the formula (5). After calculating the average JA of the backchannel frequency, the average backchannel frequency estimation unit 504 outputs the average JA of the backchannel frequency to the determination unit 505 as an average backchannel frequency and ends the average backchannel frequency estimation processing.

As described above, Embodiment 1 calculates an average JA of the backchannel frequency in voice signals in a prescribed number of frames (e.g., 60 seconds) from the voice start time of the second speaker as an average backchannel frequency and determines whether or not the second speaker is satisfied on the basis of this average backchannel frequency. During a prescribed number of frames from the voice start time, i.e., immediately after the voice call is started, the second speaker is estimated to be in a normal condition. Therefore, the backchannel frequency of the second speaker during a prescribed number of frames from the voice start time can be regarded as a backchannel frequency of the second speaker in a normal condition. As a result, according to Embodiment 1, it is possible to determine whether or not the second speaker is satisfied in consideration of an average backchannel frequency that is unique to the second speaker and it is therefore also possible to improve accuracy in determination of emotional conditions of a speaker based on a way of giving backchannel feedback.

Note that the utterance condition determination device 5 according to the present embodiment may be applied not only to the voice call system 100 that uses the IP network 4 as illustrated in FIG. 1, but also to other voice call systems that uses other telephone networks.

In addition, the average backchannel frequency estimation unit 504 in the utterance condition determination device 5 illustrated in FIG. 2 calculates an average backchannel frequency by monitoring voice signals of the first and second speakers. However, this calculation is not limited, but the average backchannel frequency estimation unit 504 may calculate an average JA of the backchannel frequency from inputs of the detection result $u_1(L)$ of the voice section detection unit 501 and the detection result $u_2(L)$ of the backchannel detection unit 502 as an example. Furthermore, the average backchannel frequency estimation unit 504 may calculate an average JA of the backchannel frequency by obtaining the calculation result IA(m) of the backchannel frequency calculation unit 503 for a prescribed number of frames from the voice start time of the second speaker as an example.

Embodiment 2

Figure 6:
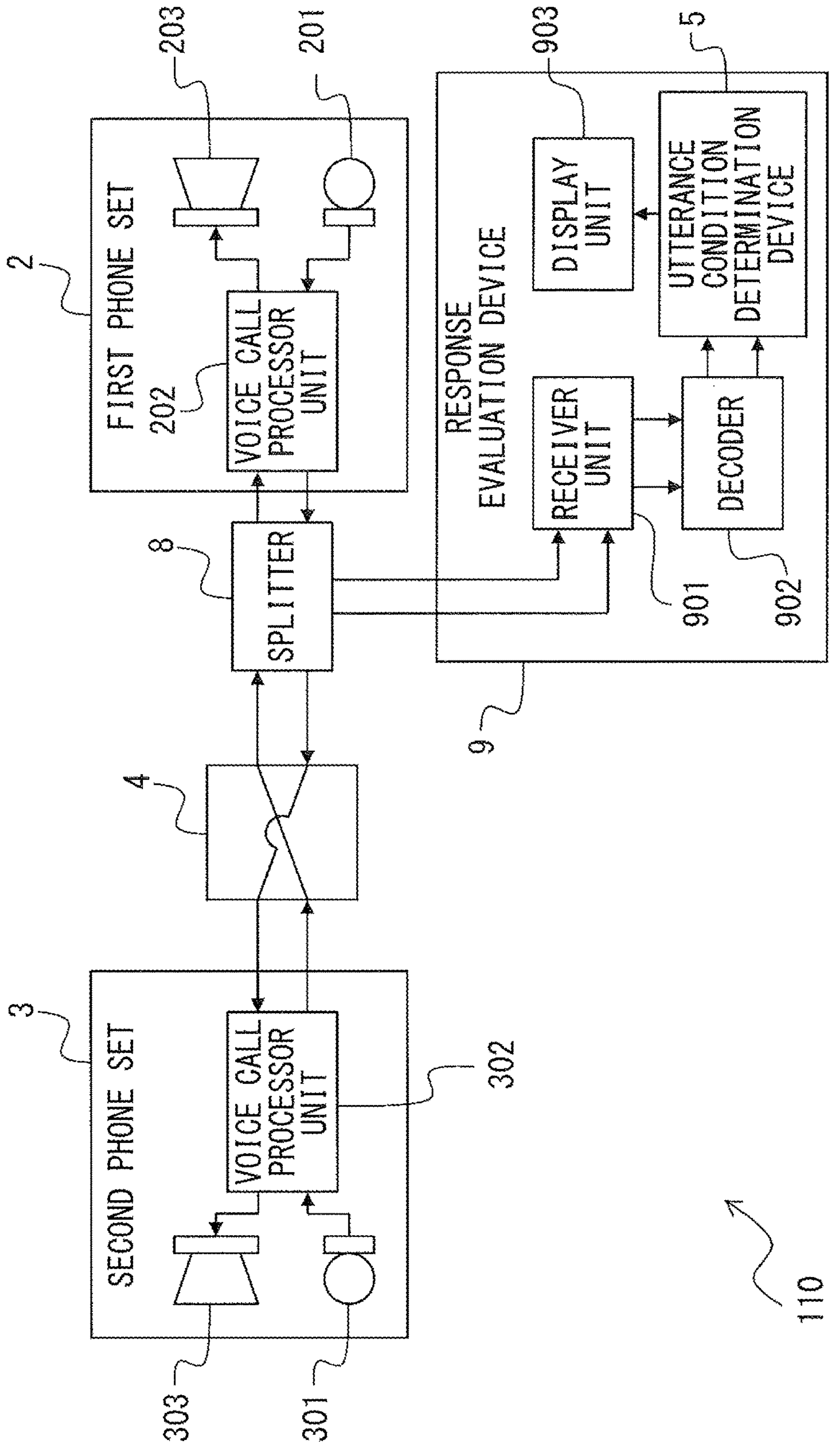
FIG. 6 is a diagram illustrating a configuration of a voice call system according to Embodiment 2.

FIG. 6 is a diagram illustrating a configuration of a voice call system according to Embodiment 2. As illustrated in FIG. 6, a voice call system 110 according to the present embodiment includes the first phone set 2, the second phone set 3, an IP network 4, a splitter 8, and a response evaluation device 9.

The first phone set 2 includes a microphone 201, a voice call processor 202, and a receiver 203. Note that the number of the first phone set 2 is not limited to only one, but plural sets can be included. The second phone set 3 is a phone set that can be connected to the first phone set 2 via the IP network 4. The second phone set 3 includes a microphone 301, a voice call processor 302, and a receiver 303.

The splitter 8 splits the voice signal of the first speaker transmitted from the voice call processor 202 of the first phone set 2 to the second phone set 3 and the voice signal of the second speaker transmitted from the second phone set 3 to the voice call processor 202 of the first phone set 2 and inputs the split signal to the response evaluation device 9. The splitter 8 is provided on a transmission path between the first phone set 2 and the IP network 4.

The response evaluation device 9 is a device that determines the satisfaction level of the second speaker (the opposing speaker of the first speaker) by using an utterance condition determination device 5. The response evaluation device 9 includes a receiver unit 901, a decoder 902, a display unit 903, and the utterance condition determination device 5.

The receiver unit 901 receives voice signals of the first and second speakers split by the splitter 8. The decoder 902 decodes the received voice signals of the first and second speakers to analog signals. The utterance condition determination device 5 determines the utterance conditions of the second speaker, i.e., whether or not the second speaker is satisfied, based on the decoded voice signals of the first and second speakers. The display unit 903 displays a determination result etc. of the utterance condition determination device 5.

In this voice call system 110, similarly to the voice call system 100 according to Embodiment 1, a voice call using the phone sets 2 and 3 becomes available by making a call connection between the first phone set 2 and the second phone set 3 in accordance with SIP.

Figure 7:
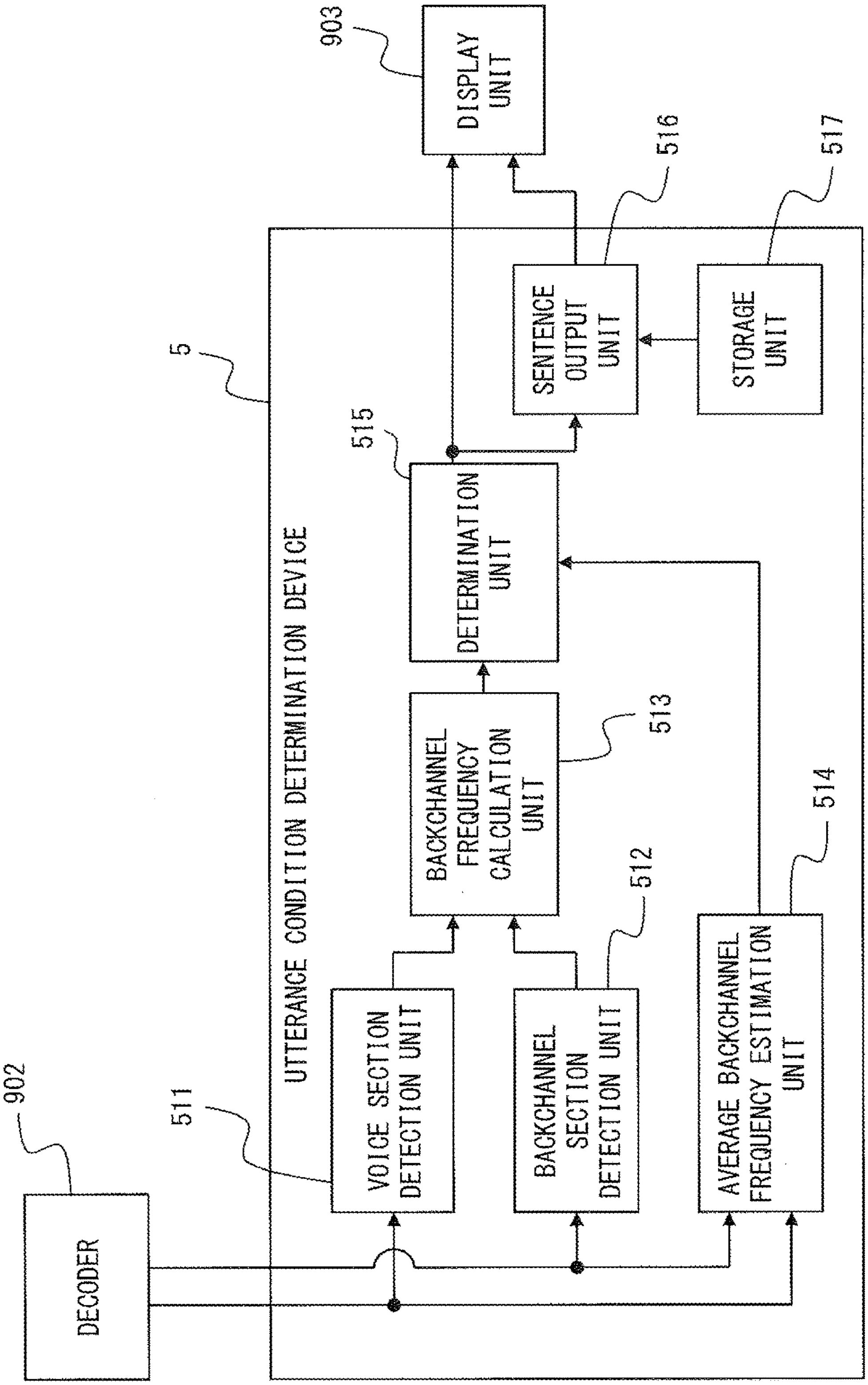
FIG. 7 is a diagram illustrating a functional configuration of the utterance condition determination device according to Embodiment 2.

FIG. 7 is a diagram illustrating a functional configuration of the utterance condition determination device according to Embodiment 2. As illustrated in FIG. 7, the utterance condition determination device 5 according to the present embodiment includes a voice section detection unit 511, a backchannel section determination unit 512, a backchannel frequency calculation unit 513, an average backchannel frequency estimation unit 514, a determination unit 515, a sentence output unit 516, and a storage unit 517.

The voice section detection unit 511 detects a voice section in voice signals of the first speaker. Similarly to the voice section detection unit 501 of the utterance condition determination device 5 according to Embodiment 1, the voice section detection unit 511 detects a section in which the power obtained from a voice signal is at or above a certain threshold TH from among the voice signals of the first speaker as a voice section.

The backchannel section detection unit 512 detects a backchannel section in voice signals of the second speaker. Similarly to the backchannel section detection unit 502 of the utterance condition determination device 5 according to Embodiment 1, the backchannel section detection unit 512 performs morphological analysis of the voice signals of the second speaker and detects a section that matches any piece of backchannel data registered in a backchannel dictionary as a backchannel section.

The backchannel frequency calculation unit 513 calculates the number of times of backchannel feedbacks of the second speaker per speech duration of the first speaker as a backchannel frequency of the second speaker. The backchannel frequency calculation unit 513 sets a certain unit of time to be one frame and calculates the backchannel frequency based on the speech duration calculated from the voice section of the first speaker within a frame and the number of times of backchannel feedbacks calculated from the backchannel section of the second speaker. Note that the backchannel frequency calculation unit 513 in the utterance condition determination device 5 according to the present embodiment calculates a backchannel frequency IB(m) provided from the following formula (8) by using the detection result of the voice section and the detection result of the backchannel section within mth frame.

$$IB(m) = \frac{cntB(m)}{\sum_j (end_j - start_j)} \tag{8}$$

In the formula (8), similarly to the formula (4), $start_j$ and $end_j$ is the start time and the end time, respectively, of a section in the voice section in which the detection result $u_1(L)$ is 1. In other words, the start time $start_j$ is a point in time at which the detection result $u_1(n)$ for each sample rises from 0 to 1, and the end time $end_j$ is a point in time at which the detection result $u_1(n)$ for each sample falls from 1 to 0. In the formula (8), cntB(m) is the number of times of the backchannel feedbacks calculated from the number of backchannel sections of the second speaker detected between the start time $start_j$ and the end time $end_j$ in the voice section of the first speaker in the mth frame.

The average backchannel frequency estimation unit 514 estimates an average backchannel frequency of the second speaker. Note that the average backchannel frequency estimation unit 514 according to the present embodiment calculates an average JB of the backchannel frequency provided from an update equation of the following formula (9) as an estimated value of the average backchannel frequency of the second speaker.

$$JB(m)=\varepsilon\cdot JB(m-1)+(1-\varepsilon)\cdot IB(m) \tag{9}$$

In the formula (9), ε represents an update coefficient and can be any value of $0<\varepsilon<1$(e.g., ε=0.9). Additionally, JB(0) =0.1 is given.

The determination unit 515 determines the satisfaction level of the second speaker, i.e., whether or not the second speaker is satisfied, based on the backchannel frequency IB(m) calculated in the backchannel frequency calculation unit 513 and the average backchannel frequency JB(m) calculated (estimated) in the average backchannel frequency estimation unit 514. The determination unit 515 outputs a determination result v(m) based on the criterion formula provided in the following formula (10).

$$v(m) = \begin{cases} 1 & (IB(m) \ge \beta \cdot JB(m)) \\ 0 & (IB(m) < \beta \cdot JB(m)) \end{cases} \tag{10}$$

The sentence output unit 516 reads out a sentence corresponding to the determination result v(m) of the satisfaction level in the determination unit 515 from the storage unit 517 and has the display unit 903 display the sentence.

FIG. 8 is a diagram providing an example of sentences stored in the storage unit.

The determination result v(m) of the satisfaction level according to the present embodiment is either one of two values 0 and 1, as provided in the formula (10). Therefore, the storage unit 517 stores two types of sentences w(m) including a sentence displayed when v(m)=0 and a sentence displayed when v(m)=1, as illustrated in FIG. 8. In addition, in the criterion formula in the formula (10), the determination result is 1, i.e., v(m)=1, when the second speaker is satisfied. Therefore, as illustrated in FIG. 8, when v(m)=0, a sentence that reports that the second speaker feels dissatisfied is displayed and when v(m)=1, a sentence that reports that the second speaker is satisfied.

Figure 9:
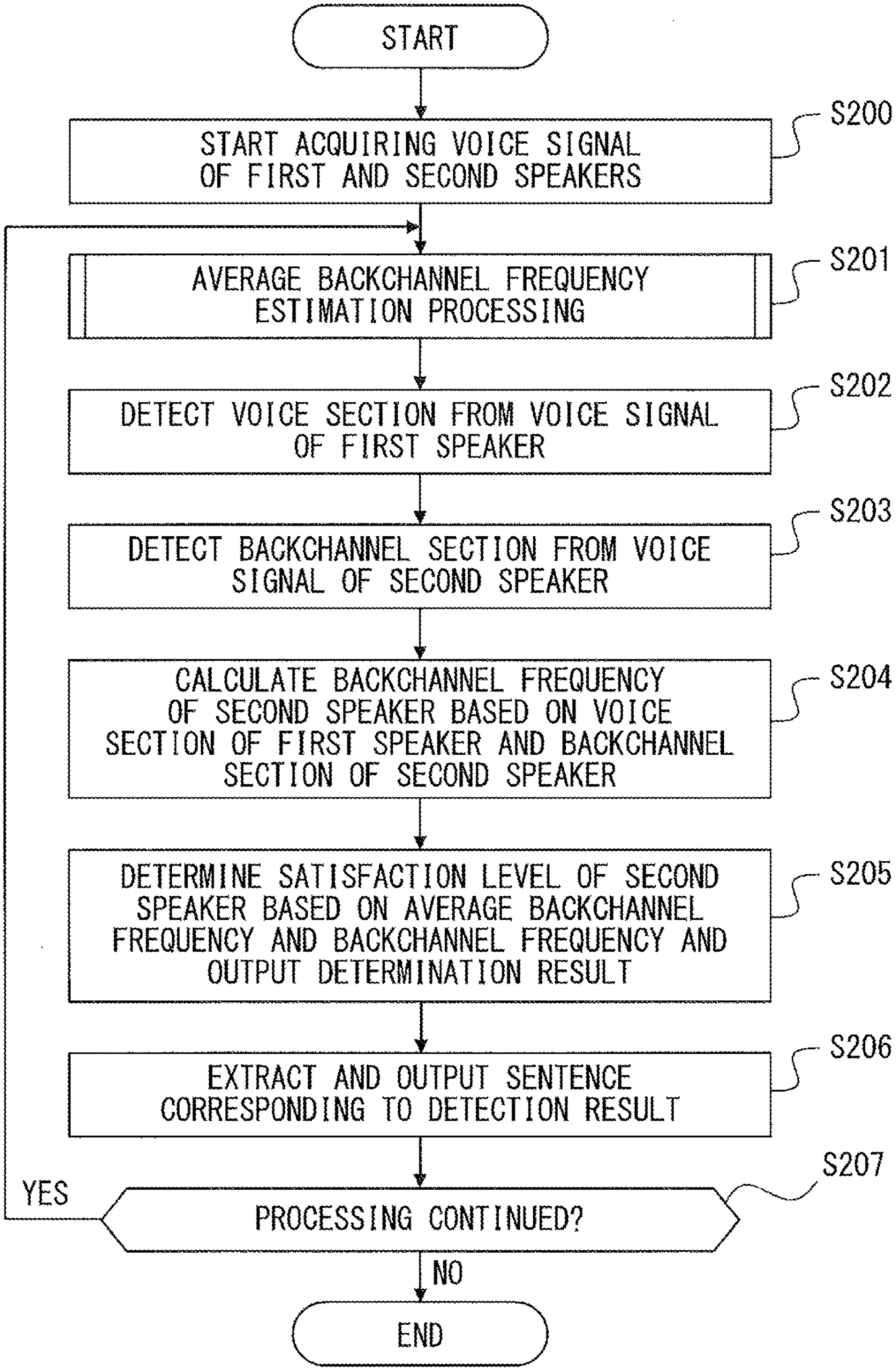
FIG. 9 is a flowchart providing details of the processing performed by the utterance condition determination device according to Embodiment 2.

FIG. 9 is a flowchart providing details of the processing performed by the utterance condition determination device according to Embodiment 2.

The utterance condition determination device 5 according to the present embodiment performs the processing illustrated in FIG. 9 when the call connection between the first phone set 2 and the second phone set 3 is connected, and a voice call becomes available.

The utterance condition determination device 5 starts acquiring a voice signal of the first and second speakers (step S200). Step S200 is performed by an acquisition unit (not illustrated) provided in the utterance condition determination device 5. The acquisition unit acquires the voice signal of the first speaker and the voice signal of the second speaker input to the utterance condition determination device 5 from the splitter 8. The acquisition unit outputs the voice signal of the first speaker to the voice section detection unit 511 and the average backchannel frequency estimation unit 514 and also outputs the voice signal of the second speaker to the backchannel section detection unit 512 and the average backchannel frequency estimation unit 514.

Next, the utterance condition determination device 5 performs the average backchannel frequency estimation processing (step S201). Step S201 is performed by the average backchannel frequency estimation unit 514. The average backchannel frequency estimation unit 514 calculates a backchannel frequency IB(m) of the voice signal of the second speaker by using the formulae (1) to (3) and (8) as an example. Afterwards, the average backchannel frequency estimation unit 514 calculates an average JB(m) of the backchannel frequency by using the formula (9) and outputs to the determination unit 515 the calculated average JB(m) of the backchannel frequency as an average backchannel frequency.

After calculating the average backchannel frequency JB(m), the utterance condition determination unit 5 performs processing to detect a voice section from the voice signal of the first speaker (step S202) and processing to detect a backchannel section from the voice signal of the second speaker (step S203). Step S202 is performed by the voice section detection unit 511. The voice section detection unit 511 calculates the detection result $u_1(L)$ of a voice section in the voice signal of the first speaker by using the formulae (1) and (2). The voice section detection unit 511 outputs the detection result $u_1(L)$ of the voice section to the backchannel frequency calculation unit 513. On the other hand, step S203 is performed by the backchannel section detection unit 512. The backchannel section detection unit 512, after detecting a backchannel section by the above-described morphological analysis etc., calculates the detection result $u_2(L)$ of the backchannel section by using the formula (3). The backchannel section detection unit 512 outputs the detection result $u_2(L)$ of the backchannel section to the backchannel frequency calculation unit 513.

When the processing in step S202 and S203 is ended, the utterance condition determination device 5, next, calculates the backchannel frequency of the second speaker based on the voice section of the first speaker and the backchannel section of the second speaker (step S204). Step S204 is performed by the backchannel frequency calculation unit 513. The backchannel frequency calculation unit 513 calculates the backchannel frequency IB(m) of the second speaker in the mth frame by using the formula (8).

Note that in the flowchart in FIG. 9, calculation of the average backchannel frequency in step S201 is followed by calculation of backchannel frequency in steps S202 to S204, but this order is not limited. Steps S202 to S204 may be performed before step S201. Alternatively, the processing in step S201 and the processing in steps S202 to S204 may be performed in parallel. Moreover, regarding the processing in steps S202 and S203, the processing in step S203 may be performed first, or the processing in steps S202 and S203 may be performed in parallel.

When the processing in steps S201 to S204 is ended, the utterance condition determination device 5 determines the satisfaction level of the second speaker based on the average backchannel frequency JB(m) and the backchannel frequency IB (m) of the second speaker and outputs a determination result to the display unit and the sentence output unit (step S205). Step S205 is performed by the determination unit 515. The determination unit 515 calculates a determination result v(m) by using the formula (10) and outputs the determination result v(m) to the display unit 903 and the sentence output unit 516.

The utterance condition determination device 5 extracts a sentence corresponding to the determination result v(m) and have the display unit 903 display the sentence (step S206). Step S206 is performed by the sentence output unit 516. The sentence output unit 516 extracts a sentence w(m) corresponding to the determination result v(m) by referencing a sentence table (see FIG. 8) stored in the storage unit 517, outputs the extracted sentence w(m) to the display unit 903 and has the display unit 903 display the sentence.

Afterwards, the utterance condition determination device 5 decides whether or not to continue the processing (step S207). When the processing is continued (step S207; YES), the utterance condition determination device 5 repeats the processing in step S201 and subsequent steps. When the processing is not continued (step S207; NO), the utterance condition determination device 5 ends the acquisition of the voice signal of the first and second speakers and ends the processing.

Figure 10:
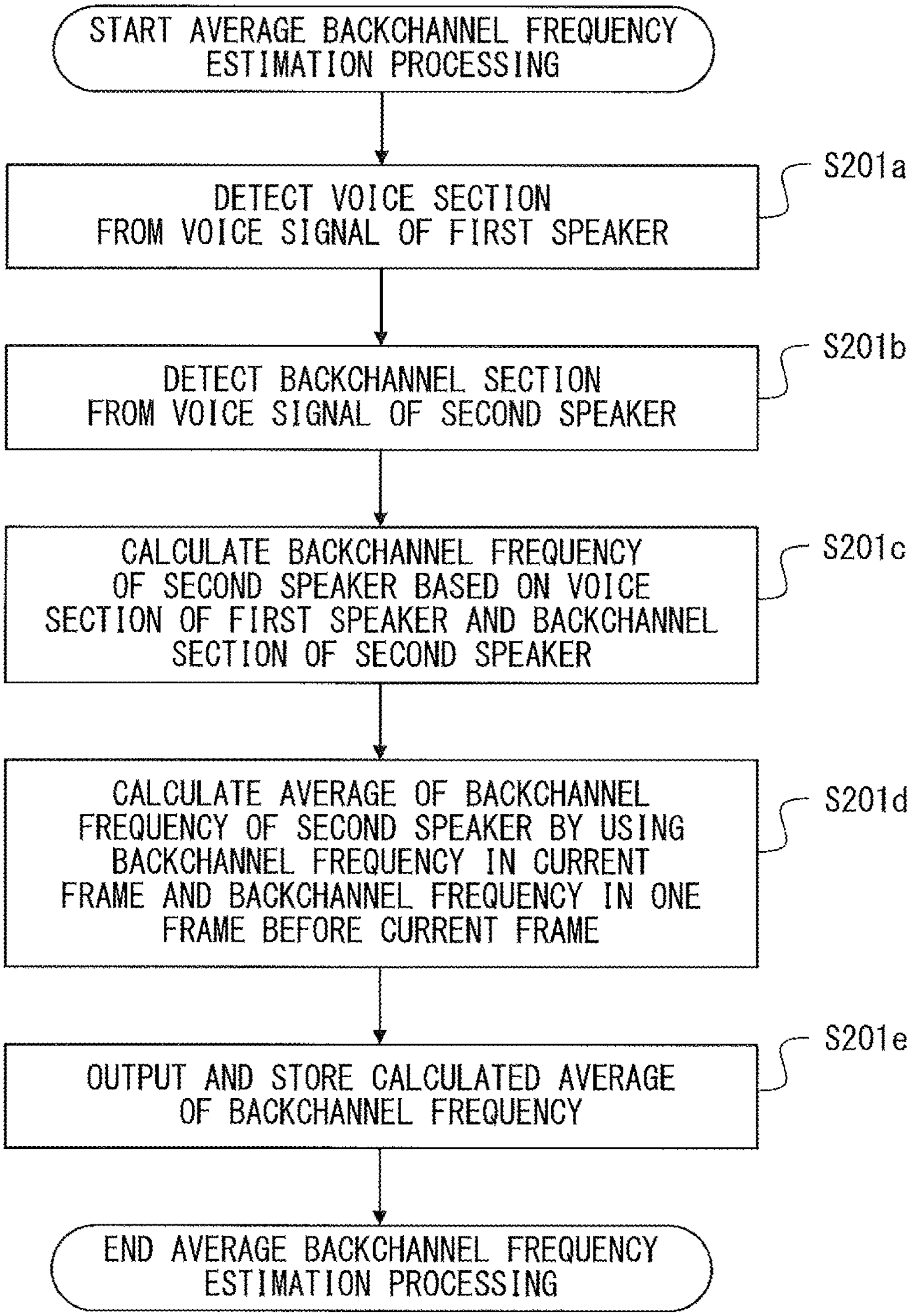
FIG. 10 is a flowchart providing details of the average backchannel frequency estimation processing according to Embodiment 2.

FIG. 10 is a flowchart providing details of the average backchannel frequency estimation processing according to Embodiment 2.

The average backchannel frequency estimation unit 514 of the utterance condition determination device 5 according to the present embodiment performs the processing illustrated in FIG. 10 in the above-described average backchannel frequency estimation processing (step S201).

The average backchannel frequency estimation unit 514 performs processing to detect a voice section from a voice signal of the first speaker (step S201*a*) and processing to detect a backchannel section from a voice signal of the second speaker (step S201*b*). In the processing in step S201*a*, the average backchannel frequency estimation unit 514 calculates a detection result $u_1(L)$ of a voice section in the voice signal of the first speaker by using the formulae (1) and (2). In the processing in step S201*b*, the average backchannel frequency estimation unit 514, after detecting a backchannel section by the above-described morphological analysis etc., calculates a detection result $u_2(L)$ of the backchannel section by using the formula (3).

Note that in the flowchart in FIG. 10, step S201*b* is performed after step S201*a*, but this sequence is not limited. Therefore, step S201*b* may be performed before step S201*a*. Also, step S201*a* and step S201*b* may be performed in parallel.

After the processing in step S201*a* and S201*b* is ended, the average backchannel frequency estimation unit 514, next, calculates a backchannel frequency IB (m) of the second speaker based on the voice section of the first speaker and the backchannel section of the second speaker (step S201*c*). In the processing in step S201*c*, the average backchannel frequency estimation unit 514 calculates a backchannel frequency IB(m) of the second speaker in the mth frame by using the formula (8).

Next, the average backchannel frequency estimation unit 514 calculates an average JB(m) of the backchannel frequency of the second speaker in the current frame by using a backchannel frequency IB(m) of the current frame and an average JB(m−1) of the backchannel frequency of the second speaker in the frame before the current frame (step S201*d*). In the processing in step S201*d*, the average backchannel frequency estimation unit 514 calculates an average backchannel frequency JB(m) in the current frame (the mth frame) by using the formula (9).

Afterwards, the average backchannel frequency estimation unit 514 outputs the average JB(m) of the backchannel frequency calculated in step S201*d* to the determination unit 515 as an average backchannel frequency and stores the average JB(m) of the backchannel frequency (step S201*e*), and the average backchannel frequency estimation unit 514 ends the average backchannel frequency estimation processing.

As described above, also in Embodiment 2, the satisfaction level of the second speaker is determined on the basis of the average backchannel frequency JB(m) and the backchannel frequency IB(m) calculated from the voice signal of the second speaker. Therefore, similarly to Embodiment 1, it is possible to determine whether or not the second speaker is satisfied in consideration of an average backchannel frequency that is unique to the second speaker and it is therefore also possible to improve accuracy in determination of emotional conditions of a speaker based on a way of giving backchannel feedback.

Note that the utterance condition determination device 5 according to the present embodiment may be applied not only to the voice call system 110 that uses the IP network 4 as illustrated in FIG. 6, but also to other voice call systems that uses other telephone networks. In addition, the voice call system 110 may use a distributor instead of the splitter 8.

In addition, the average backchannel frequency estimation unit 514 in the utterance condition determination device 5 illustrated in FIG. 7 calculates an average backchannel frequency JB(m) by acquiring voice signals of the first and second speakers decoded by the decoder 902. However, this calculation is not limited, but the average backchannel frequency estimation unit 514 may calculate an average JB(m) of the backchannel frequency from inputs of the detection result $u_1(L)$ of the voice section detection unit 511 and the detection result $u_2(L)$ of the backchannel detection unit 512 as an example. Furthermore, the average backchannel frequency estimation unit 514 may calculate an average JB(m) of the backchannel frequency by obtaining the backchannel frequency IB(m) calculated in the backchannel frequency calculation unit 513 as an example.

Moreover, the utterance condition determination device 5 according to the present embodiment determines the satisfaction level of the second speaker based on the backchannel frequency IB(m) calculated by using the formulae (1) to (3) and (8) and the average backchannel frequency JB(m) calculated by using the backchannel frequency IB(m). However, the configuration of the utterance condition determination device 5 in the response evaluation device 9 illustrated in FIG. 6 may be the same as the configuration of the utterance condition determination device 5 explained in Embodiment 1 (see FIG. 2), for example.

Embodiment 3

Figure 11:
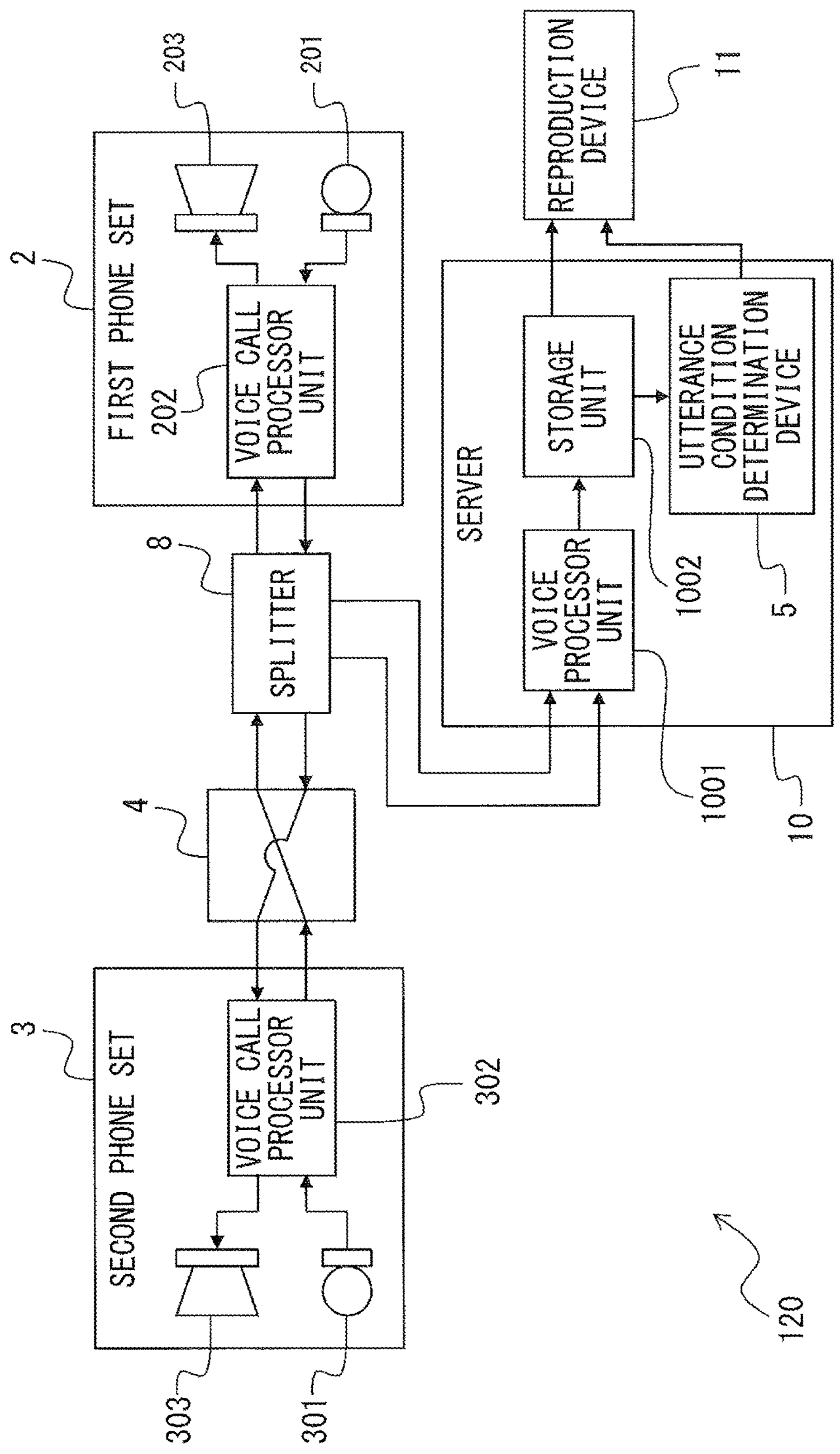
FIG. 11 is a diagram illustrating a configuration of a voice call system according to Embodiment 3.

FIG. 11 is a diagram illustrating a configuration of a voice call system according to Embodiment 3. As illustrated in FIG. 11, a voice call system 120 according to the present embodiment includes the first phone set 2, the second phone set 3, an IP network 4, a splitter 8, a server 10, and a reproduction device 11.

The first phone set 2 includes a microphone 201, a voice call processor 202, and a receiver 203. The second phone set 3 is a phone set that can be connected to the first phone set 2 via the IP network 4. The second phone set 3 includes a microphone 301, a voice call processor 302, and a receiver 303.

The splitter 8 splits the voice signal of the first speaker transmitted from the voice call processor 202 of the first phone set 2 to the second phone set 3 and the voice signal of the second speaker transmitted from the second phone set 3 to the voice call processor 202 of the first phone set 2 and inputs the split signal to the server 10. The splitter 8 is provided on a transmission path between the first phone set 2 and the IP network 4.

The server 10 is a device that makes the voice signals of the first and second speakers that is input via the splitter 8 into a voice file, stores the file, and determines the satisfaction level of the second speaker (the opposing speaker of the first speaker) when necessary. The server 10 includes a voice processor unit 1001, a storage unit 1002, and the utterance condition determination device 5. The voice processor unit 1001 performs processing of generating a voice file from the voice signals of the first and second speakers. The storage unit 1002 stores the generated voice file of the first and second speakers. The utterance condition determination device 5 determines the satisfaction level of the second speaker by reading out the voice file of the first and second speakers.

The reproduction device 11 is a device to read out and reproduce a voice file of the first and second speakers stored in the storage unit 1002 of the server 10 and to display the determination result of the utterance condition determination device 5.

Figure 12:
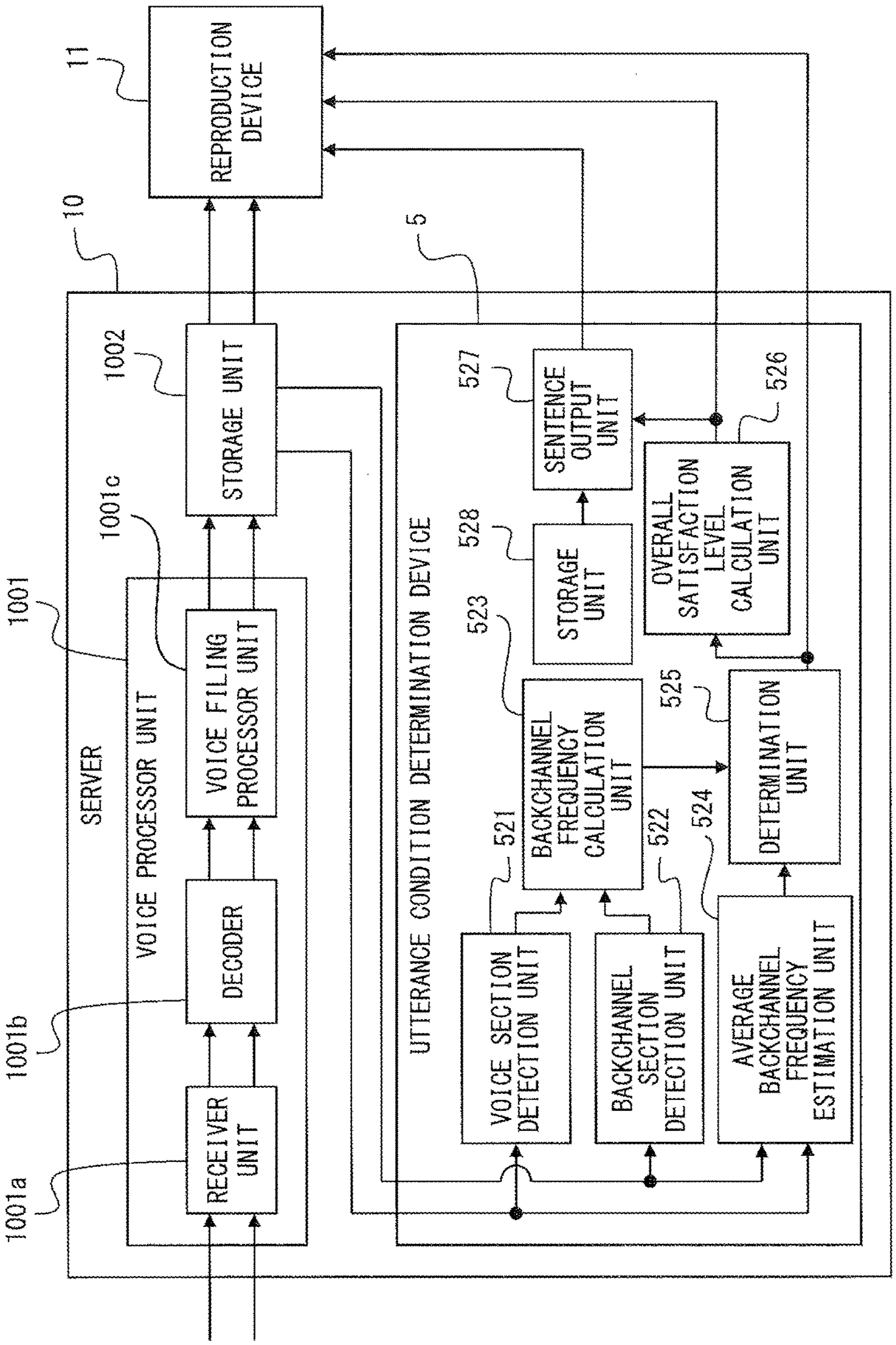
FIG. 12 is a diagram illustrating a functional configuration of the server according to Embodiment 3.

FIG. 12 is a diagram illustrating a functional configuration of the server according to Embodiment 3.

As illustrated in FIG. 12, the voice processor unit 1001 of the server 10 according to the present embodiment includes a receiver unit 1001*a*, a decoder 1001*b*, and a voice filing processor unit 1001*c*.

The receiver unit 1001*a* receives voice signals of the first and second speakers split by the splitter 8. The decoder 1001*b* decodes the received voice signals of the first and second speakers to analog signals. The voice filing processor unit 1001*c* generates electronic files (voice files) of the voice signals of the first and second speakers decoded in the decoder 1001*b*, respectively, associates the voice file of each, and stores the files in the storage unit 1002.

The storage unit 1002 stores the voice files of the first and second speaker associated with each other for each voice call. The voice files stored in the storage unit 1002 is transferred to the reproduction device 11 in response to a read request from the reproduction device 11. In the following descriptions, the voice files of the first and second speakers may be referred to as voice signals.

The utterance condition determination device 5 reads out the voice files of the first and second speakers stored in the storage unit 1002, determines the utterance condition of the second speaker, i.e., whether or not the second speaker is satisfied, and output the determination to the reproduction device 11. As illustrated in FIG. 12B, the utterance condition determination device 5 according to the present embodiment includes a voice section detection unit 521, a backchannel section determination unit 522, a backchannel frequency calculation unit 523, an average backchannel frequency estimation unit 524, and a determination unit 525. The utterance condition determination device 5 further includes an overall satisfaction level calculation unit 526, a sentence output unit 527, and a storage unit 528.

The voice section detection unit 521 detects a voice section in voice signals of the first speaker. Similarly to the voice section detection unit 501 of the utterance condition determination device 5 according to Embodiment 1, the voice section detection unit 521 detects a section in which the power obtained from a voice signal is at or above a certain threshold TH from among the voice signals of the first speaker as a voice section.

The backchannel section detection unit 522 detects a backchannel section in voice signals of the second speaker. Similarly to the backchannel section detection unit 502 of the utterance condition determination device 5 according to Embodiment 1, the backchannel section detection unit 522 performs morphological analysis of the voice signals of the second speaker and detects a section that matches any piece of backchannel data registered in a backchannel dictionary as a backchannel section.

The backchannel frequency calculation unit 523 calculates the number of times of backchannel feedbacks of the second speaker per speech duration of the first speaker as a backchannel frequency of the second speaker. The backchannel frequency calculation unit 523 sets a certain unit of time to be one frame and calculates the backchannel frequency based on the speech duration calculated from the voice section of the first speaker within a frame and the number of times of backchannel feedbacks calculated from the backchannel section of the second speaker. Note that the backchannel frequency calculation unit 523 in the utterance condition determination device 5 according to the present embodiment calculates a backchannel frequency IC (m) provided from the following formula (11) by using the detection result of the voice section and the detection result of the backchannel section within mth frame.

$$IC(m) = \frac{cntC(m)}{\sum_j (end_j - start_j)} \tag{11}$$

In the formula (11), similarly to the formula (4), $start_j$ and $end_j$ is the start time and the end time, respectively, of a section in the voice section in which the detection result $u_1(L)$ is 1. In other words, the start time $start_j$ is a point in time at which the detection result $u_1(n)$ for each sample rises from 0 to 1, and the end time $end_j$ is a point in time at which the detection result $u_1(n)$ for each sample falls from 1 to 0. Furthermore, cntC(m) is the number of times of the backchannel feedbacks of the second speaker in a time period between the start time $start_j$ and the end time $end_j$ of the voice section of the first speaker and a time period within a certain period of time t immediately after the end time $end_j$ in the mth frame. The number of times of the backchannel feedbacks cntC(m) is calculated from the number of times that the detection result $u_2(n)$ of the backchannel section rises from 0 to 1 in the above time periods.

The average backchannel frequency estimation unit 524 estimates an average backchannel frequency of the second speaker. The average backchannel frequency estimation unit 524 according to the present embodiment calculates an average JC of the backchannel frequency provided from the following formula (12) as an estimated value of the average backchannel frequency of the second speaker.

$$JC = \frac{1}{M+1}\sum_{m=0}^{M} IC(m) \tag{12}$$

In the formula (12), M is the frame number of the last (end time) frame in the voice signal of the second speaker. In other words, the average backchannel frequency JC is an average of the backchannel frequencies from the voice start time to the end time of the second speaker in units of frames.

The determination unit 525 determines the satisfaction level of the second speaker, i.e., whether or not the second speaker is satisfied, based on the backchannel frequency IC(m) calculated in the backchannel frequency calculation unit 523 and the average backchannel frequency JC calculated (estimated) in the average backchannel frequency estimation unit 524. The determination unit 525 outputs a determination result v(m) based on the criterion formula provided from the following formula (13).

$$v(m) = \begin{cases} 0 & (0 < IC(m) < \beta_1 \cdot JC) \\ 1 & (\beta_1 \cdot JC \le IC(m) \le \beta_2 \cdot JC) \\ 2 & (\beta_2 \cdot JC < IC(m)) \end{cases} \tag{13}$$

In the formula (13), each of $\beta_1$ and $\beta_2$ is a correction coefficient, and $\beta_1$=0.2 and $\beta_2$=1.5 are given.

The overall satisfaction level calculation unit 526 calculates the overall satisfaction level V of the second speaker in a voice call between the first speaker and the second speaker. The overall satisfaction level calculation unit 526 calculates the overall satisfaction level V by using the following formula (14).

$$V = \frac{100}{2M}(c_0 * 0 + c_1 * 1 + c_2 * 2) \tag{14}$$

In the formula (14), $c_0$, $c_1$, and $c_2$ are the number of frames in which v(m)=0, the number of frames in which v(m)=1, and the number of frames in which v(m)=2, respectively.

The sentence storage unit 527 reads out a sentence corresponding to the overall satisfaction level V calculated in the overall satisfaction level calculation unit 526 from the storage unit 528 and outputs the sentence to the reproduction device 11.

Figure 13:
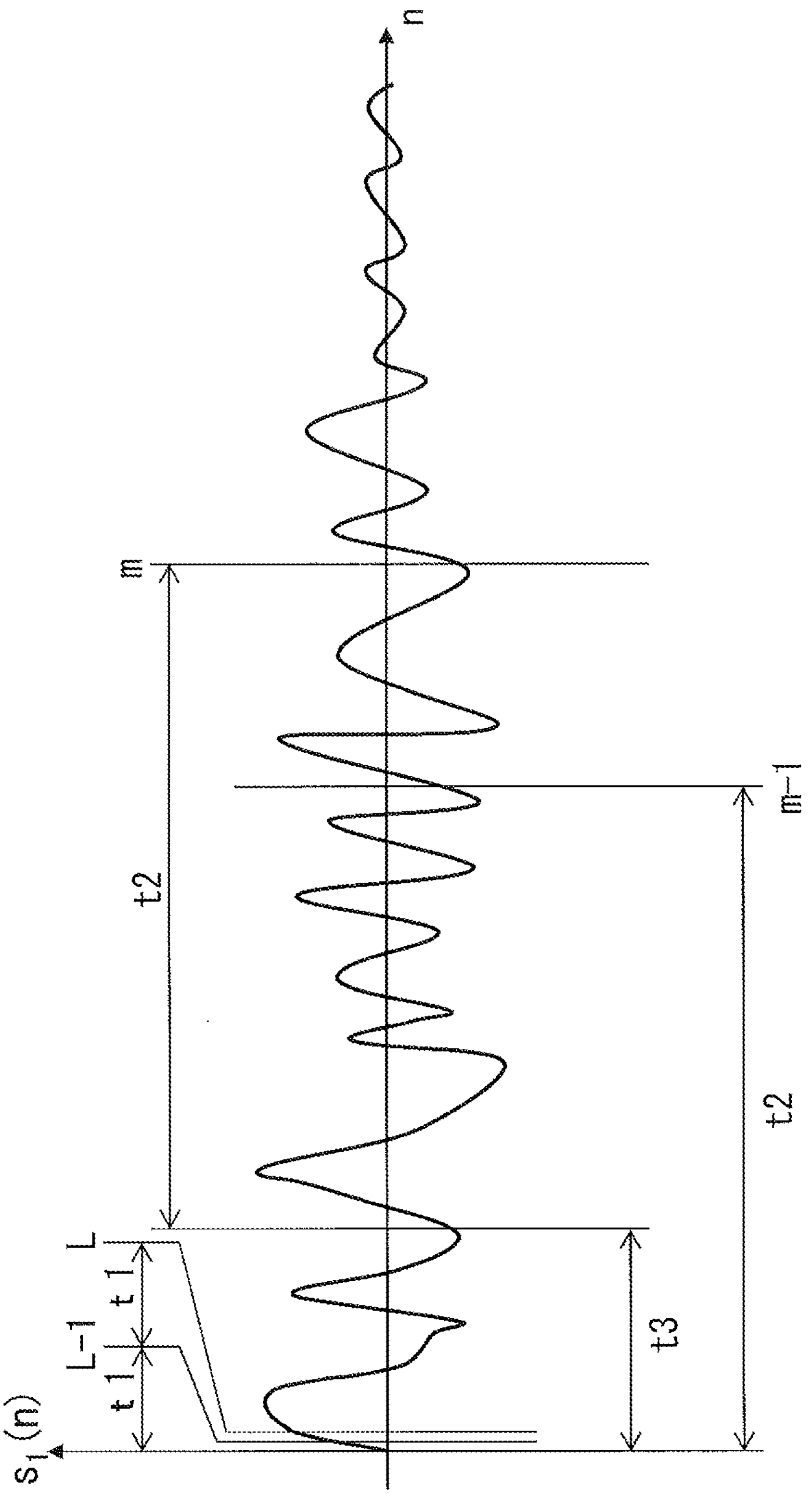
FIG. 13 is a diagram explaining processing units of the voice signal in the utterance condition determination device.

FIG. 13 is a diagram explaining processing units of the voice signal in the utterance condition determination device 5 according to the present embodiment.

When detection of a voice section and detection of a backchannel section are performed in the utterance condition determination device 5 according to the present embodiment, for example, processing for every sample n of the voice signal, sectional processing for every time t1, and frame processing for every time t2 are performed as illustrated in FIG. 13. Note that the frame processing for every time t2 is overlapped processing and the start time of each of the frames is delayed by time t3 (e.g., 10 seconds). In FIG. 13, $s_1(n)$ represents the amplitude of the nth sample in the voice signal of the first speaker. Additionally, in FIG. 13, L−1 and L each represents a section number, and the time t1 corresponding to one section is 20 msec as an example. Moreover, in FIG. 13, m−1 and m each represents a frame number and the time t2 corresponding to one frame is 30 seconds as an example.

FIG. 14 is a diagram providing an example of sentences stored in the storage unit.

The sentence output unit 527 in the utterance condition determination device 5 according to the present embodiment reads out a sentence corresponding to the overall satisfaction level V from the storage unit 528 and outputs the sentence to the reproduction device 11 as described above. The overall satisfaction level V is a value calculated by using the formula (14) and is any value from 0 to 100. The overall satisfaction level V calculated by using the formula (14) is also a value that becomes larger as the value of $c_2$, i.e., the number of frames in which v(m)=2, becomes larger. As a result, the overall satisfaction level V takes a larger value closer to 100 as the satisfaction level of the second speaker is higher. Therefore, from among the sentences stored in the storage unit 528, a sentence indicating that the second speaker feels dissatisfied is read out when the overall satisfaction level V is low, and a sentence indicating that the second speaker is satisfied is read out when the overall satisfaction level V is high. In the storage unit 528, five types of sentences w(m) that correspond to the levels of the overall satisfaction level V are stored as illustrated in FIG. 14 as an example.

Figure 15:
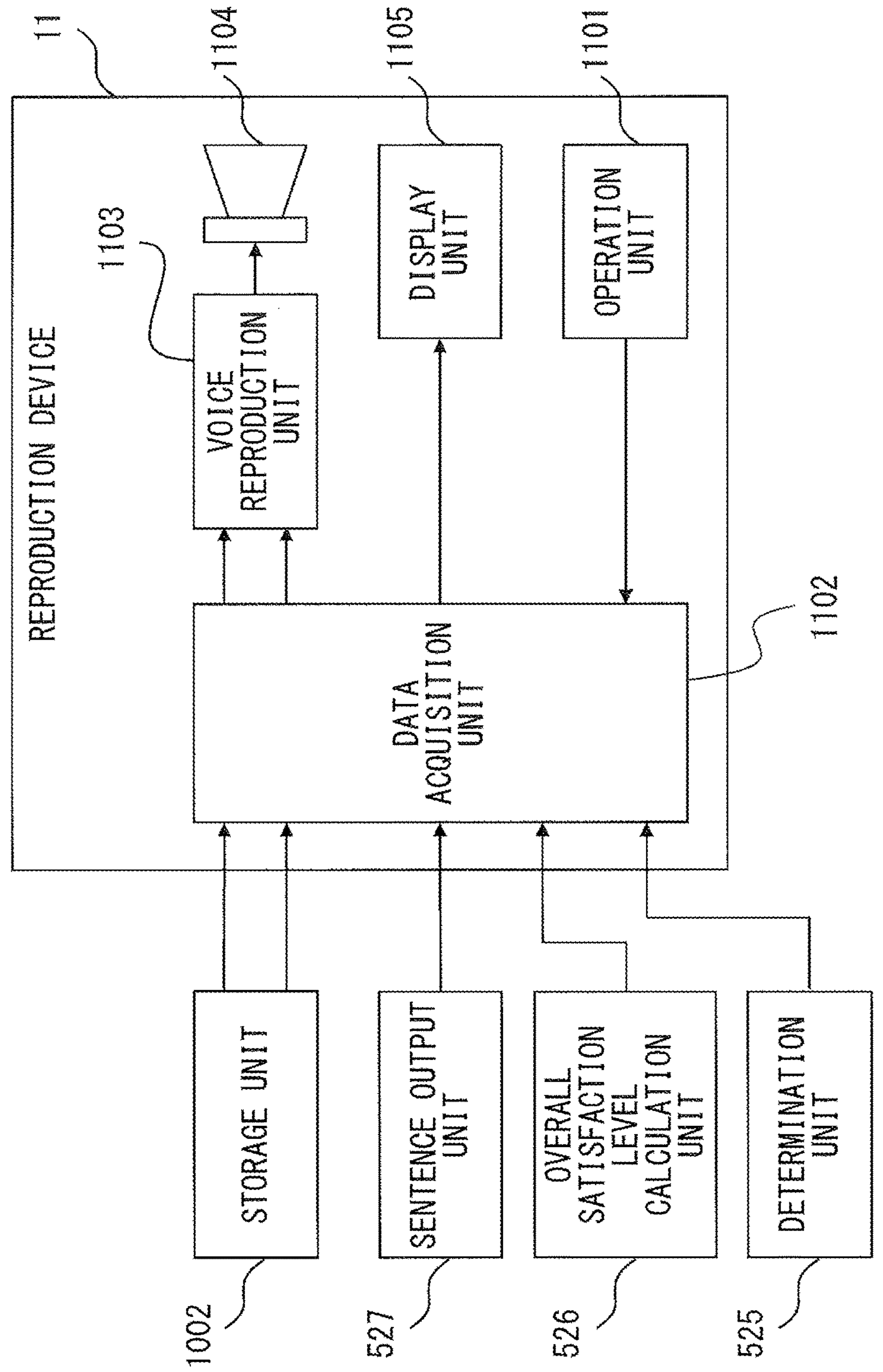
FIG. 15 is a diagram illustrating a functional configuration of the reproduction device according to Embodiment 3.

FIG. 15 is a diagram illustrating a functional configuration of the reproduction device according to Embodiment 3. As illustrated in FIG. 15, the reproduction device 11 according to the present embodiment includes an operation unit 1101, a data acquisition unit 1102, a voice reproduction unit 1103, a speaker 1104, and a display unit 1105.

The operation unit 1101 is an input device such as a keyboard device and a mouse device that an operator of the reproduction device 11 operates and is used for an operation to select a voice call record to be reproduced and other operations.

The data acquisition unit 1102 acquires a voice file of the first and second speakers corresponding to the voice call record selected by the operation of the operation unit 1101 and also acquires a sentence etc. corresponding to the determination result of the satisfaction level or the overall satisfaction level in the utterance condition determination device 5 in relation to the acquired voice file. The data acquisition unit 1102 acquires a voice file of the first and second speakers from the storage unit 1002 of the server 10. The data acquisition unit 1102 also acquires the determination results etc. from the determination unit 525, the overall satisfaction level calculation unit 526, and the sentence output unit 527 of the utterance condition determination device 5.

The voice reproduction unit 1103 performs processing to convert the voice file (electronic file) of the first and second speaker acquired in the data acquisition unit 1102 into analog signals that can be output from the speaker 1104.

The display unit 1105 displays the sentence corresponding to the determination result of the satisfaction level or the overall satisfaction level V acquired in the data acquisition unit 1102.

Figure 16:
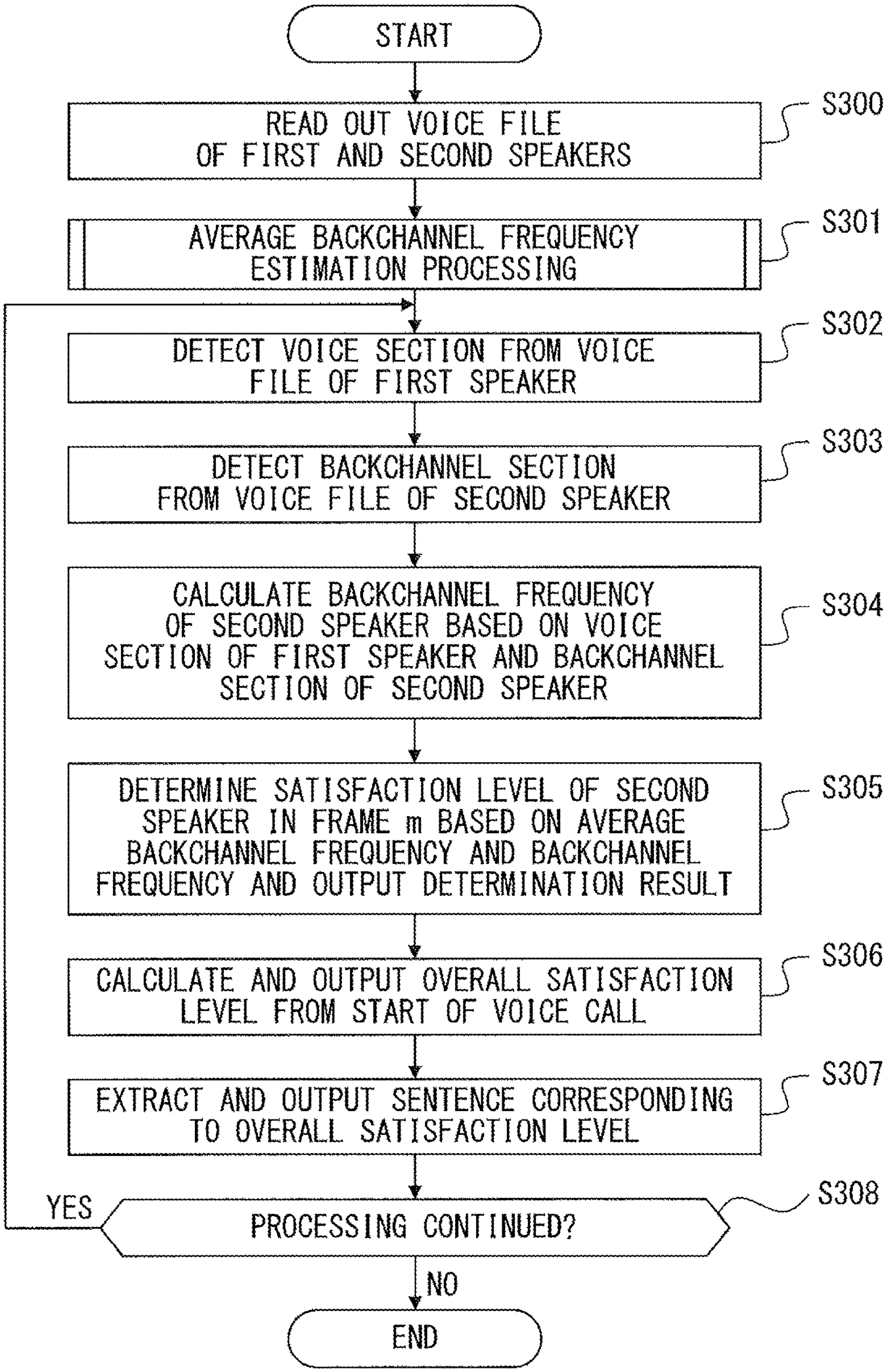
FIG. 16 is a flowchart providing details of the processing performed by the utterance condition determination device according to Embodiment 3.

FIG. 16 is a flowchart providing details of the processing performed by the utterance condition determination device according to Embodiment 3.

The utterance condition determination device 5 according to the present embodiment performs the processing provided in FIG. 16 when the server 10 receives a transfer request of a voice file from the data acquisition unit 1102 of the reproduction device 11 as an example.

The utterance condition determination device 5 reads out a voice file of the first and second speakers from the storage unit 1002 of the server 10 (step S300). Step S300 is performed by an acquisition unit (not illustrated) provided in the utterance condition determination device 5. The acquisition unit acquires voice files of the first and second speaker that corresponds to a voice call record requested by the reproduction device 11. The acquisition unit outputs a voice file of the first speaker to the voice section detection unit 521 and the average backchannel frequency estimation unit 524 and outputs a voice file of the second speaker to the backchannel section detection unit 522 and the average backchannel frequency estimation unit 524.

Next, the utterance condition determination device performs the average backchannel frequency estimation processing (step S301). Step S301 is performed by the average backchannel frequency estimation unit 524. The average backchannel frequency estimation unit 524 calculates a backchannel frequency IC(m) of the second speaker by using the formulae (1) to (3) and (11) as an example. Afterwards, the average backchannel frequency estimation unit 524 calculates an average JC of the backchannel frequency by using the formula (12) and outputs to the determination unit 525 the calculated average JC of the backchannel frequency as an average backchannel frequency.

After calculating the average backchannel frequency JC, the utterance condition determination unit 5 performs processing to detect a voice section from the voice signal of the first speaker (step S302) and processing to detect a backchannel section from the voice signal of the second speaker (step S303). Step S302 is performed by the voice section detection unit 521. The voice section detection unit 521 calculates the detection result $u_1(L)$ of a voice section in the voice signal of the first speaker by using the formulae (1) and (2). The voice section detection unit 521 outputs the detection result $u_1(L)$ of the voice section to the backchannel frequency calculation unit 523. On the other hand, step S303 is performed by the backchannel section detection unit 522. The backchannel section detection unit 522, after detecting a backchannel section by the above-described morphological analysis etc., calculates the detection result $u_2(L)$ of the backchannel section by using the formula (3). The backchannel section detection unit 522 outputs the detection result $u_2(L)$ of the backchannel section to the backchannel frequency calculation unit 523.

Note that in the flowchart in FIG. 16, step S303 is performed after step S302, but this sequence is not limited. Therefore, step S303 may be performed before step S302. Also, step S302 and step S303 may be performed in parallel.

When the processing in step S302 and S303 is ended, the utterance condition determination device 5, next, calculates the backchannel frequency of the second speaker based on the voice section of the first speaker and the backchannel section of the second speaker (step S304). Step S304 is performed by the backchannel frequency calculation unit 523. The backchannel frequency calculation unit 523 calculates the backchannel frequency IC(m) of the second speaker in the mth frame by using the formula (11).

The utterance condition determination device 5, next, determines the satisfaction level of the second speaker in the frame m based on the average backchannel frequency JC and the backchannel frequency IC(m) of the second speaker and outputs a determination result to the reproduction device 11 (step S305). Step S305 is performed by the determination unit 525. The determination unit 525 calculates a determination result v(m) by using the formula (13) and outputs the determination result v(m) to the reproduction device 11 and the overall satisfaction calculation unit 526.

The utterance condition determination device 5 calculates the overall satisfaction level V by using the value of the determination result v(m) of the satisfaction level in each frame and outputs the overall satisfaction level V to the reproduction device 11 and the sentence output unit 527 (step S306). Step S306 is performed by the overall satisfaction level calculation unit 526. The overall satisfaction level calculation unit 526 calculates the overall satisfaction level V of the second speaker by using the formula (14).

The utterance condition determination device 5 reads out a sentence w(m) corresponding to the overall satisfaction level V from the storage unit 528 and outputs the sentence to the reproduction device 11 (step S307). Step S307 is performed by the sentence output unit 527. The sentence output unit 527 extracts a sentence w(m) corresponding to the overall satisfaction level V by referencing a sentence table (see FIG. 13) stored in the storage unit 528 and outputs the extracted sentence w(m) to the reproduction device 11.

Afterwards, the utterance condition determination device 5 decides whether or not to continue the processing (step S308). When the processing is continued (step S308; YES), the utterance condition determination device 5 repeats the processing in step S302 and subsequent steps. When the processing is not continued (step S308; NO), the utterance condition determination device 5 ends the processing.

Figure 17:
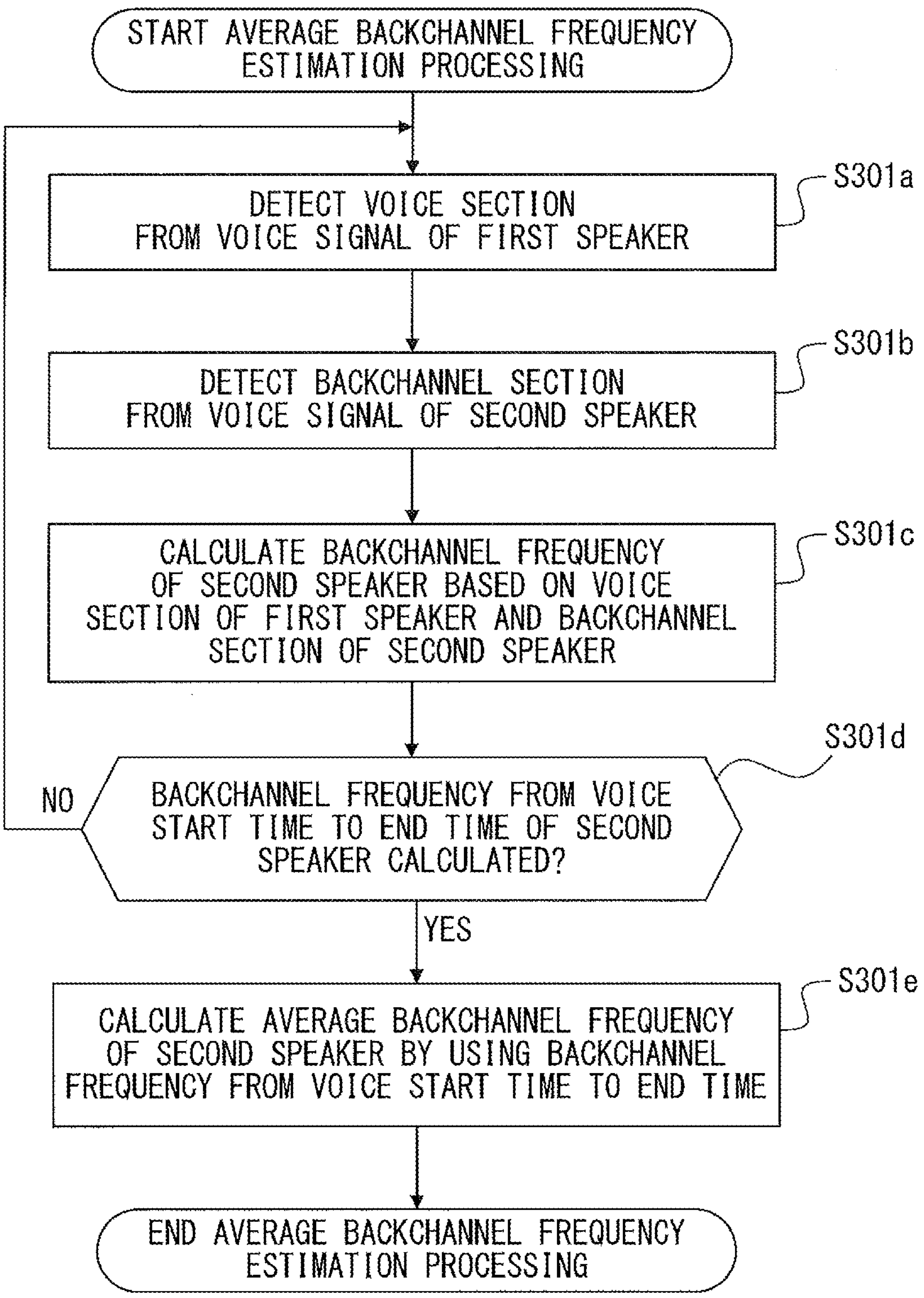
FIG. 17 is a flowchart providing details of average backchannel frequency estimation processing according to Embodiment 3.

FIG. 17 is a flowchart providing details of average backchannel frequency estimation processing according to Embodiment 3.

The average backchannel frequency estimation unit 524 of the utterance condition determination device 5 according to the present embodiment performs the processing illustrated in FIG. 17 in the above-described average backchannel frequency estimation processing (step S301).

The average backchannel frequency estimation unit 524 performs processing to detect a voice section from a voice signal of the first speaker (step S301*a*) and processing to detect a backchannel section from a voice signal of the second speaker (step S301*b*). In the processing in step S301*a*, the average backchannel frequency estimation unit 524 calculates a detection result $u_1(L)$ of a voice section in the voice signal of the first speaker by using the formulae (1) and (2). In the processing in step S301*b*, the average backchannel frequency estimation unit 524, after detecting a backchannel section by the above-described morphological analysis etc., calculates a detection result $u_2(L)$ of the backchannel section by using the formula (3).

Note that in the flowchart in FIG. 17, step S301*b* is performed after step S301*a*, but this sequence is not limited. Therefore, step S301*b* may be performed before step S301*a*. Also, step S301*a* and step S301*b* may be performed in parallel.

The average backchannel frequency estimation unit 524, next, calculates a backchannel frequency IC(m) of the second speaker based on the voice section of the first speaker and the backchannel section of the second speaker (step S301*c*). In the processing in step S301*c*, the average backchannel frequency estimation unit 524 calculates a backchannel frequency IC(m) of the second speaker in the mth frame by using the formula (11).

Next, the average backchannel frequency estimation unit 524 checks whether or not the backchannel frequency from the voice start time of the second speaker to the end time is calculated (step S301*d*). When the backchannel frequency from the voice start time to the end time is not calculated (step S301*d*; NO), the average backchannel frequency estimation unit 524 repeats the processing in steps S301*a* to S301*c*. When the backchannel frequency from the voice start time to the end time is calculated (step S301*d*; YES), the average backchannel frequency estimation unit 524, next, calculates an average JC of the backchannel frequency of the second speaker from the backchannel frequency from the voice start time to the end time (step S301*e*). In the processing in step S301*e*, the average backchannel frequency estimation unit 524 calculates an average JC of the backchannel frequency by using the formula (12). After calculating the average JC of the backchannel frequency, the average backchannel frequency estimation unit 524 outputs the calculated average JC of the backchannel frequency to the determination unit 525 as an average backchannel frequency and ends the average backchannel frequency estimation processing.

As described above, also in Embodiment 3, the satisfaction level of the second speaker is determined on the basis of the average backchannel frequency JC and the backchannel frequency IC(m) calculated from the voice signal of the second speaker. Therefore, similarly to Embodiment 1, it is possible to determine whether or not the second speaker is satisfied in consideration of an average backchannel frequency that is unique to the second speaker and it is therefore also possible to improve accuracy in determination of emotional conditions of a speaker based on a way of giving backchannel feedback.

Moreover, in Embodiment 3, because a voice call of the first and second speakers by using the first and second phone sets 2 and 3 is stored in the storage unit 1002 of the server 10 as a voice file (an electronic file), the voice file can be reproduced and listened to after the voice call ends. In Embodiment 3, the overall satisfaction level V of the second speaker is calculated during voice file reproduction and outputs a sentence corresponding to the overall satisfaction level V to the reproduction device 11. It is therefore possible to check the overall satisfaction level of the voice call and a sentence corresponding to the overall satisfaction level, in addition to the satisfaction level of the second speaker in each frame (section), in the display unit 1105 of the reproduction device 11 while the voice file is viewed after the voice call ends.

Note that the server 10 in the voice call system provided as an example in the present embodiment may be installed in any place that is not limited to a facility in which the first phone set 2 is installed and may be connected to the first phone set 2 or the reproduction device 11 via a communication network such as the Internet.

Embodiment 4

Figure 18:
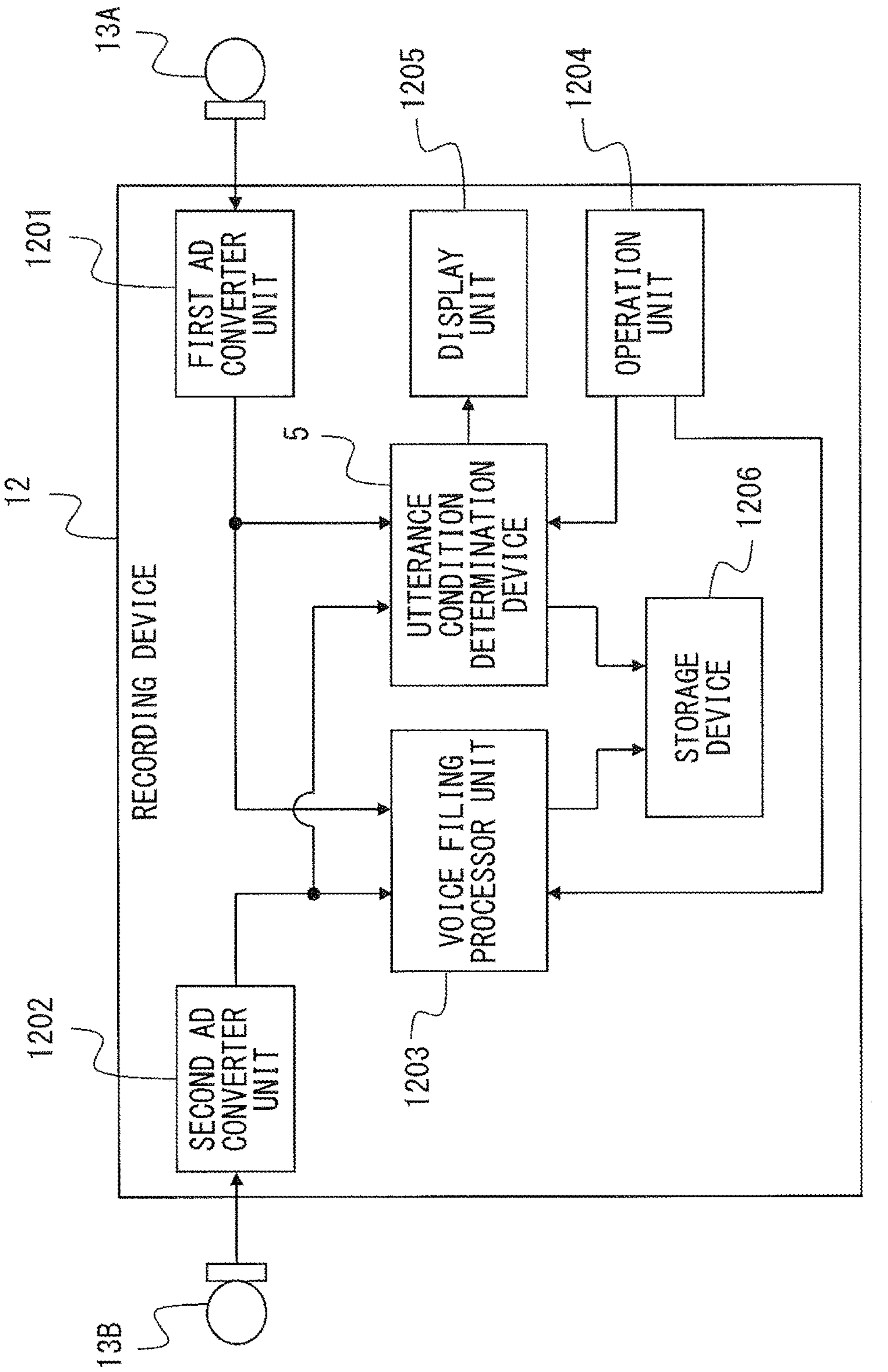
FIG. 18 is a diagram illustrating a configuration of a recording device according to Embodiment 4.

FIG. 18 is a diagram illustrating a configuration of a recording device according to Embodiment 4. As illustrated in FIG. 18, a recording device 12 according to the present embodiment includes the first Analog-to-Digital (AD) converter unit 1201, the second AD converter unit 1202, a voice filing processor unit 1203, an operation unit 1204, a display unit 1205, a storage device 1206, and the utterance condition determination device 5.

The first AD converter unit 1201 converts a voice signal collected by the first microphone 13A from an analog signal to a digital signal. The second AD converter unit 1202 converts a voice signal collected by the second microphone 13B from an analog signal to a digital signal. In the following descriptions, the voice signal collected by the first microphone 13A is a voice signal of the first speaker and the voice signal collected by the second microphone 13B is a voice signal of the second speaker.

The voice filing processor unit 1203 generates an electronic file (a voice file) of the voice signal of the first speaker converted by the first AD converter unit 1201 and the voice signal of the second speaker converted by the second AD converter unit 1202, associates these voice files with each other, and stores the files in the storage unit 1206.

The utterance condition determination device 5 determines the utterance condition (the satisfaction level) of the second speaker by using, for example, the voice signal of the first speaker converted by the first AD converter 1201 and the voice signal of the second speaker converted by the second AD converter 1202. The utterance condition determination device 5 also associates the determination result with a voice file generated by the voice filing processor unit 1203 and store the determination result in the storage device 1206.

The operation unit 1204 is a button switch etc. used for operating the recording device 12. For example, when an operator of the recording device 12 starts recording by operating the operation unit 1204, a start command of prescribed processing is input from the operation unit 1204 to each of the voice filing processor unit 1203 and the utterance condition determination device 5.

The display unit 1205 displays the determination result (the satisfaction level of the second speaker) etc. of the utterance condition determination device 5.

The storage device 1206 is a device to store voice files of the first and second speakers, the satisfaction level of the second speaker and so forth. Note that the storage device 1206 may be constructed from a portable recording medium such as a memory card and a recording medium drive unit that can read data from and write data in the recording medium.

Figure 19:
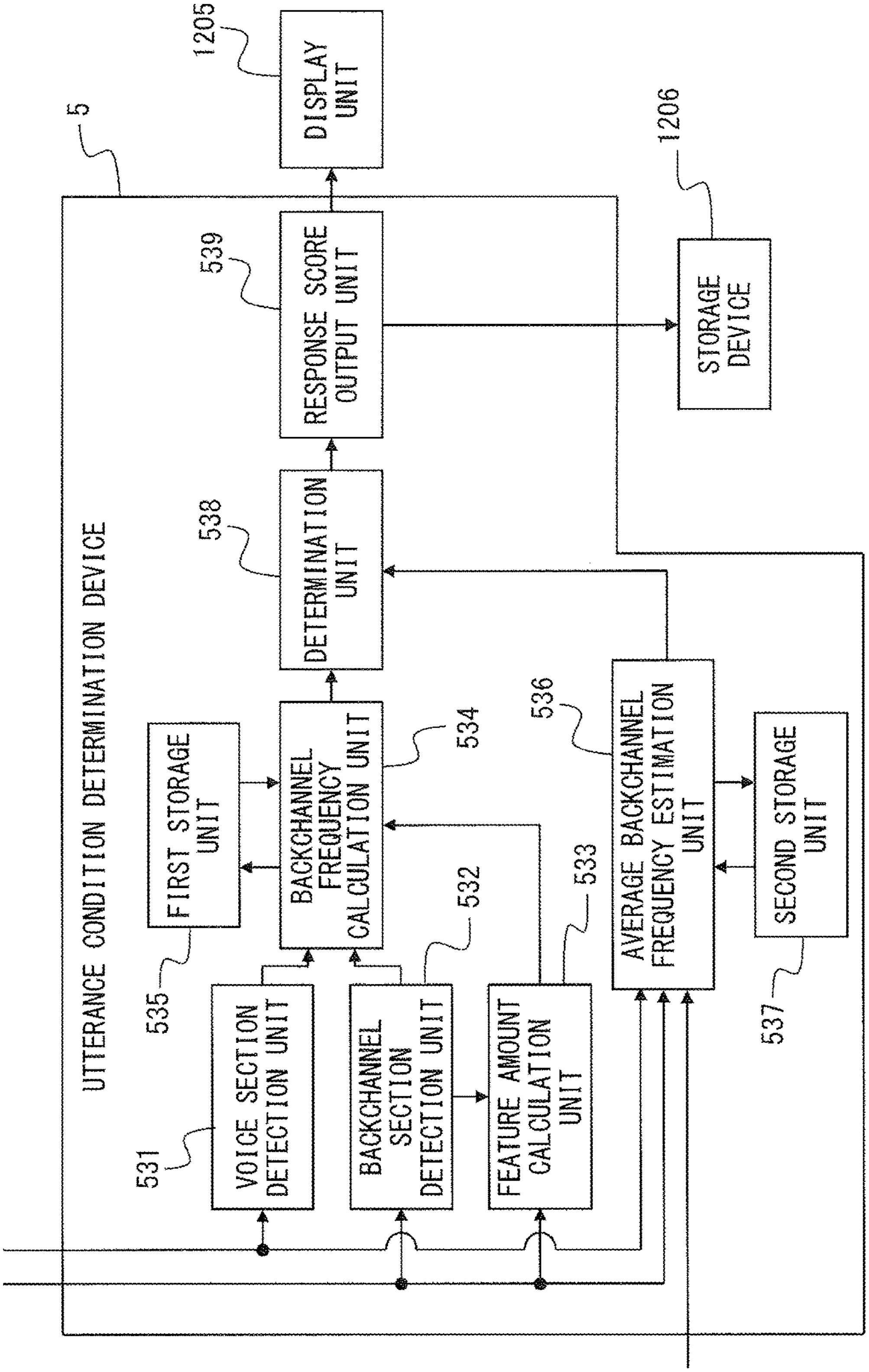
FIG. 19 is a diagram illustrating a functional configuration of the utterance condition determination device according to Embodiment 4.

FIG. 19 is a diagram illustrating a functional configuration of the utterance condition determination device according to Embodiment 4. As illustrated in FIG. 19, the utterance condition determination device 5 according to the present embodiment includes a voice section detection unit 531, a backchannel section detection unit 532, a feature amount calculation unit 533, a backchannel frequency calculation unit 534, the first storage unit 535, an average backchannel frequency estimation unit 536, and the second storage unit 537. The utterance condition determination device 5 further includes a determination unit 538 and a response score output unit 539.

The voice section detection unit 531 detects a voice section in the voice signals of the first speaker (voice signals of a speaker collected by the first microphone 13A). Similarly to the voice section detection unit 501 of the utterance condition determination device 5 according to Embodiment 1, the voice section detection unit 531 detects a section in which the power obtained from a voice signal is at or above a certain threshold TH from among the voice signals of the first speaker as a voice section.

The backchannel section detection unit 532 detects a backchannel section in voice signals of the second speaker (voice signals of a speaker collected by the second microphone 13B). Similarly to the backchannel section detection unit 502 of the utterance condition determination device 5 according to Embodiment 1, the backchannel section detection unit 532 performs morphological analysis of the voice signals of the second speaker and detects a section that matches any piece of backchannel data registered in a backchannel dictionary as a backchannel section.

The feature amount calculation unit 533 calculates a vowel type h(L) and an amount of pitch shift df(L) based on the voice signals of the second speaker and the backchannel section detected by the backchannel section detection unit 532. The vowel type h(L) is calculated, for example, by a method described in Non-Patent Document 1. The amount of pitch shift df(L) is calculated, for example, by the following formula (15).

$$df(L)=f(L)-f(L-1) \tag{15}$$

In the formula (15), f (L) is a pitch within a section L and can be calculated by a known method such as pitch detection by autocorrelation or cepstrum analysis of the section.

The backchannel frequency calculation unit 534 sorts backchannel feedbacks into two conditions, affirmative and negative, based on the vowel type h(L) and the amount of pitch shift df(L) and calculates the backchannel frequency ID(m) provided by the following formula (16).

$$ID(m)=\frac{\mu_0\cdot cnt_0(m)+\mu_1\cdot cnt_1(m)}{\sum_j(end_j-start_j)} \tag{16}$$

In the formula (16), $start_j$ and $end_j$ are the start time and the end time, respectively, of a voice section of the first speaker explained in Embodiment 1. In the formula (16), $cnt_0(m)$ and $cnt_1(m)$ are the number of times of backchannel feedbacks calculated by using backchannel sections in an affirmative condition and the number of times of backchannel feedbacks calculated by using backchannel sections in a negative condition, respectively. In addition, in the formula (16), $\mu_0$ and $\mu_1$ are weighting coefficients and $\mu_0=0.8$ and $\mu_1=1.2$ are given. Note backchannel feedbacks are sorted into affirmative or negative by referencing backchannel intension determination information stored in the first storage unit 535.

The average backchannel frequency estimation unit 536 estimates an average backchannel frequency of the second speaker. The average backchannel frequency estimation unit 536 according to the present embodiment calculates a value JD corresponding to an speech rate r in a time period in which a prescribed number of frames have elapsed from the voice start time of the second speaker as an estimation value of the average backchannel frequency of the second speaker. The speech rate r is calculated by using a known method (e.g., a method described in Patent Document 4). After calculating the speech rate r, the average backchannel frequency estimation unit 536 calculates an average backchannel frequency JD of the second speaker by referencing a correspondence table of the speech rate r and the average backchannel frequency JD stored in the second storage unit 537. The average backchannel frequency estimation unit 536 calculates the average backchannel frequency JD every time a change is made to speaker information $info_2(n)$ of the second speaker. The speaker information $info_2(n)$ is input from the operation unit 1204 as an example.

The determination unit 538 determines the satisfaction level of the second speaker, i.e., whether or not the second speaker is satisfied, based on the backchannel ID(m) calculated in the backchannel frequency calculation unit 534 and the average backchannel frequency JD calculated (estimated) in the average backchannel frequency estimation unit 536. The determination unit 538 outputs a determination result v(m) based on the criterion formula provided in the following formula (17).

$$v(m) = \begin{cases} 0 & (0 < ID(m) < \beta_1 \cdot JD) \\ 1 & (\beta_1 \cdot JD \le ID(m) \le \beta_2 \cdot JD) \\ 2 & (\beta_2 \cdot JD < ID(m)) \end{cases} \quad (17)$$

In the formula (17), $\beta_1$ and $\beta_2$ are correction coefficients and $\beta_1$=0.2 and $\beta_2$=1.5 are provided as an example.

The response score output unit 539 calculates a response score v'(m) in each frame by using the following formula (18).

$$v'(m) = \begin{cases} 0 & (v(m) = 0) \\ 1 & (v(m) = 1) \\ 2 & (v(m) = 2) \end{cases} \quad (18)$$

The response score output unit 539 outputs the calculated response score v'(m) to the display unit 1205 and has the storage device 1206 store the response score in association with the voice file generated in the voice filing processor unit 1203.

FIG. 20 is a diagram providing an example of the backchannel intension determination information. The backchannel intension determination information referenced by the backchannel frequency calculation unit 534 is information in which backchannel feedbacks are sorted into affirmative or negative based on a combination of the vowel type and the amount of pitch shift. For example, in the case of the vowel type h(L) being "/a/" in a section L, the backchannel feedback is determined to be affirmative when the amount of pitch shift df(L) is 0 or larger (rising pitch), and the backchannel feedback is determined to be negative when the amount of pitch shift df(L) is less than 0 (falling pitch).

FIG. 21 is a diagram providing an example of the correspondence table of the speech rate and the average backchannel frequency.

While Embodiment 1 through Embodiment 3 calculate the average backchannel frequency based on the backchannel frequency, the present embodiment calculates the average backchannel frequency JD based on the speech rate r as described above.

A speaker of a high speech rate (i.e., a fast speaker) tends to have shorter intervals of backchannel feedbacks and therefore makes backchannel feedbacks more frequently compared with a speaker of a low speech rate. For that reason, as in the correspondence table provided in FIG. 21, the average backchannel frequency JD becomes greater in proportion to the speech rate r, for example, the average backchannel frequency JD that has a tendency similar to that of Embodiments 1 to 3 can be calculated (estimated).

Figure 22:
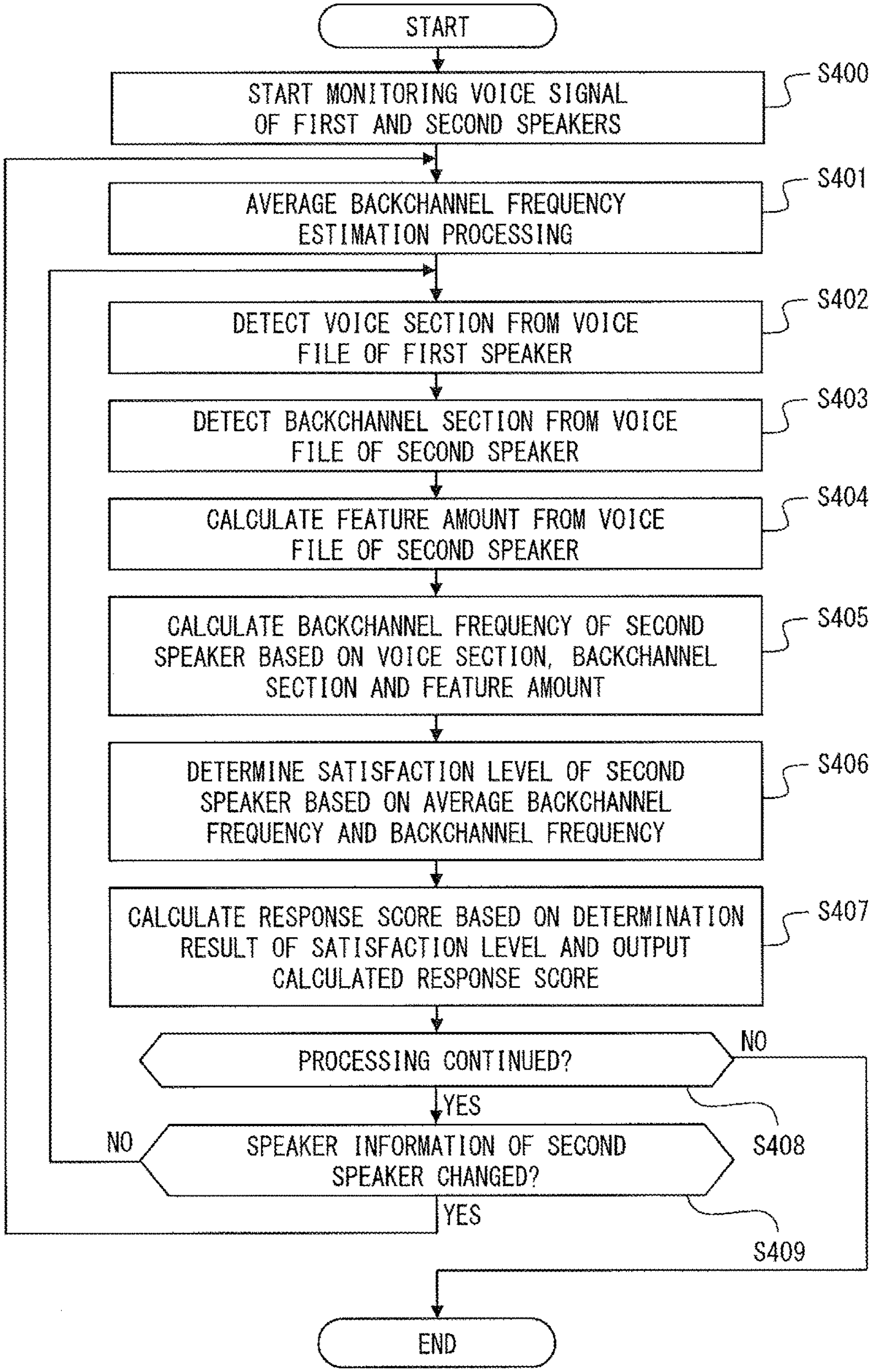
FIG. 22 is a flowchart providing details of processing performed by the utterance condition determination device according to Embodiment 4.

FIG. 22 is a flowchart providing details of processing performed by the utterance condition determination device according to Embodiment 4.

The utterance condition determination device 5 according to the present embodiment performs the processing provided in FIG. 22A and FIG. 22B when an operator operates the operation unit 1204 of the recording device 12 so that the recording device 12 starts recording processing.

The utterance condition determination device 5 starts monitoring voice signals of the first and second speakers (step S400). Step S400 is performed by a monitoring unit (not illustrated) provided in the utterance condition determination device 5. The monitoring unit monitors the voice signals of the first speaker and the voice signals of the second speaker transmitted from the first AD converter 1201 and the second AD converter 1202, respectively, to the voice filing processor unit 1203. The monitoring unit outputs the voice signals of the first speaker to the voice section detection unit 531 and the average backchannel frequency estimation unit 536. The monitoring unit also outputs the voice signals of the second speaker to the backchannel section detection unit 532, the feature amount calculation unit 533, and the average backchannel frequency estimation unit 536.

The utterance condition determination device 5, next, performs the average backchannel frequency estimation processing (step S401). Step S401 performs the average backchannel frequency estimation unit 536. The average backchannel frequency estimation unit 536 calculates an speech rate r of the second speaker based on the voice signals for two frames (60 seconds) from the voice start time of the second speaker as an example. The speech rate r is calculated by any known calculation method (e.g., a method described in Patent Document 4). Afterwards, the average backchannel frequency estimation unit 536 references the correspondence table stored in the second storage unit 537 and outputs the average backchannel frequency JD corresponding to the speech rate r to the determination unit 538 as an average backchannel frequency of the second speaker.

After calculating the average backchannel frequency JD, the utterance condition determination device 5, next, performs processing to detect a voice section from the voice file of the first speaker (step S402) and processing to detect a backchannel section form the voice file of the second speaker (step S403). Step S402 is performed by the voice section detection unit 531. The voice section detection unit 531 calculates a detection result $u_1(L)$ of a voice section in the voice signal of the first speaker by using the formulae (1) and (2) and outputs the detection result $u_1(L)$ of the voice section to the backchannel frequency calculation unit 534. Step S403 is performed by the backchannel section detection unit 532. The backchannel section detection unit 532, after detecting a backchannel section by the above-described morphological analysis etc., calculates the detection result $u_2(L)$ of the backchannel section by using the formula (3) and outputs the detection result $u_2(L)$ of the backchannel section to the backchannel frequency calculation unit 534.

After the detection of a backchannel section, the utterance condition determination device 5, next, calculates a feature amount of the backchannel section in the voice file of the second speaker (step S404). Step S404 is performed by the feature amount calculation unit 533. The feature amount calculation unit 533 calculates the vowel type h(L) and the amount of pitch shift df(L) as a feature amount of the backchannel section. The vowel type h(L) is calculated by any known calculation method (e.g., a method described in Non-Patent Document 1) by using the detection result $u_2(L)$ of the backchannel section of the backchannel section detection unit 532. The amount of pitch shift df(L) is calculated by using the formula (15). The feature amount calculation unit 533 outputs the calculated feature amount, i.e., the vowel type h(L) and the amount of pitch shift df(L), to the backchannel frequency calculation unit 534.

Note that in the flowchart in FIG. 22A, step S403 and step S404 are performed after step S402, but this sequence is not limited. Therefore, the processing in step S403 and step S404 may be performed first. Alternatively, the processing in step S402 and the processing in step S403 and step S404 may be performed in parallel.

After the processing in steps S402 through S404, the utterance condition determination device 5, next, calculates a backchannel frequency of the second speaker based on the voice section of the first speaker and the backchannel section and the feature amount of the second speaker (step S405). Step S405 is performed by the backchannel frequency calculation unit 534. In step S405, the backchannel frequency calculation unit 534 obtains the number of times of affirmative backchannel feedbacks $cnt_0(m)$ and the number of times of negative backchannel feedbacks $cnt_1(m)$ based on the backchannel intension determination information in the first storage unit 535 and the feature amount calculated in step S404. Afterwards, the backchannel frequency calculation unit 534 calculates the backchannel frequency ID(m) of the second speaker in the mth frame by using the formula (16) and outputs the backchannel frequency ID(m) to the determination unit 538.

Next, the utterance condition determination device 5 determines the satisfaction level of the second speaker based on the average backchannel frequency JD and the backchannel frequency ID(m) of the second speaker (step S406). Step S406 is performed by the determination unit 538. The determination unit 538 calculates the determination result v(m) by using the formula (17). The determination unit 538 outputs the determination result v(m) to the response score output unit 539 as the satisfaction level of the second speaker.

Next, the utterance condition determination device 5 calculates the response score of the first speaker based on the determination result of the satisfaction level of the second speaker and outputs the calculated response score (step S407). Step S407 is performed by the response score output unit 539. The response score output unit 539 calculates a response score v'(m) by using the determination result v(m) of the determination unit 538 and the formula (18). The response score output unit 539 has the display unit 1205 display the calculated response score v' (m) and also has the storage device 1206 store the response score.

After outputting the response score v' (m), the utterance condition determination device 5 determines whether or not to continue the processing (step S408). When the processing is not continued (step S408; NO), the utterance condition determination device 5 ends the monitoring of the voice signals of the first and second speakers and ends the processing.

On the other hand, when the processing is continued (step S408; YES), the utterance condition determination device 5, next, checks whether or not a change has been made to speaker information of the second speaker (step S409). When no change has been made to the speaker information $info_2(n)$ (step S409; NO), the utterance condition determination device 5 repeats the processing in step S402 and subsequent steps. When a change has been made to the speaker information $info_2(n)$ (step S409; YES), the utterance condition determination device 5 brings the processing back to step S401, calculates the average backchannel frequency JD for the changed second speaker and performs the processing in step S402 and subsequent steps.

A described above, in Embodiment 4, the satisfaction level of the second speaker can be indirectly obtained by calculating the response score v' (m) of the first speaker based on the average backchannel frequency JD and the backchannel frequency ID (m) calculated from the voice signals of the second speaker.

In addition, because the average backchannel frequency JD is calculated in accordance with the speech rate r of the second speaker in Embodiment 4, the average backchannel frequency can be calculated appropriately even though the second speaker is, for example, a speaker who infrequently gives backchannel feedback by nature.

Moreover, in Embodiment 4, backchannel feedbacks are sorted into affirmative backchannel feedbacks and negative backchannel feedbacks in accordance with the vowel type h(L) and the amount of pitch shift df(L) calculated in the feature amount calculation unit 533 and the backchannel frequency ID (m) is calculated on the basis of the sorting. For that reason, the backchannel frequency ID(m) in Embodiment 4 changes its value in response to the number of times of the affirmative backchannel feedbacks even though the number of times of the backchannel feedbacks in one frame is the same. It is therefore possible to determine whether or not the second speaker is satisfied on the basis of whether the backchannel feedbacks are affirmative or negative even though the second speaker is a speaker who infrequently gives backchannel feedback by nature.

Note that the utterance condition determination device 5 according to the present embodiment can be applied not only to the recording device 12 illustrated in FIG. 18 but also to the voice call system provided as an example in Embodiments 1 to 3. In addition, the storage device 1206 in the recording device 12 may be constructed from a portable recording medium such as a memory card and a recording medium drive unit that can read data from the portable recording medium and can write data in the portable recording medium.

Embodiment 5

Figure 23:
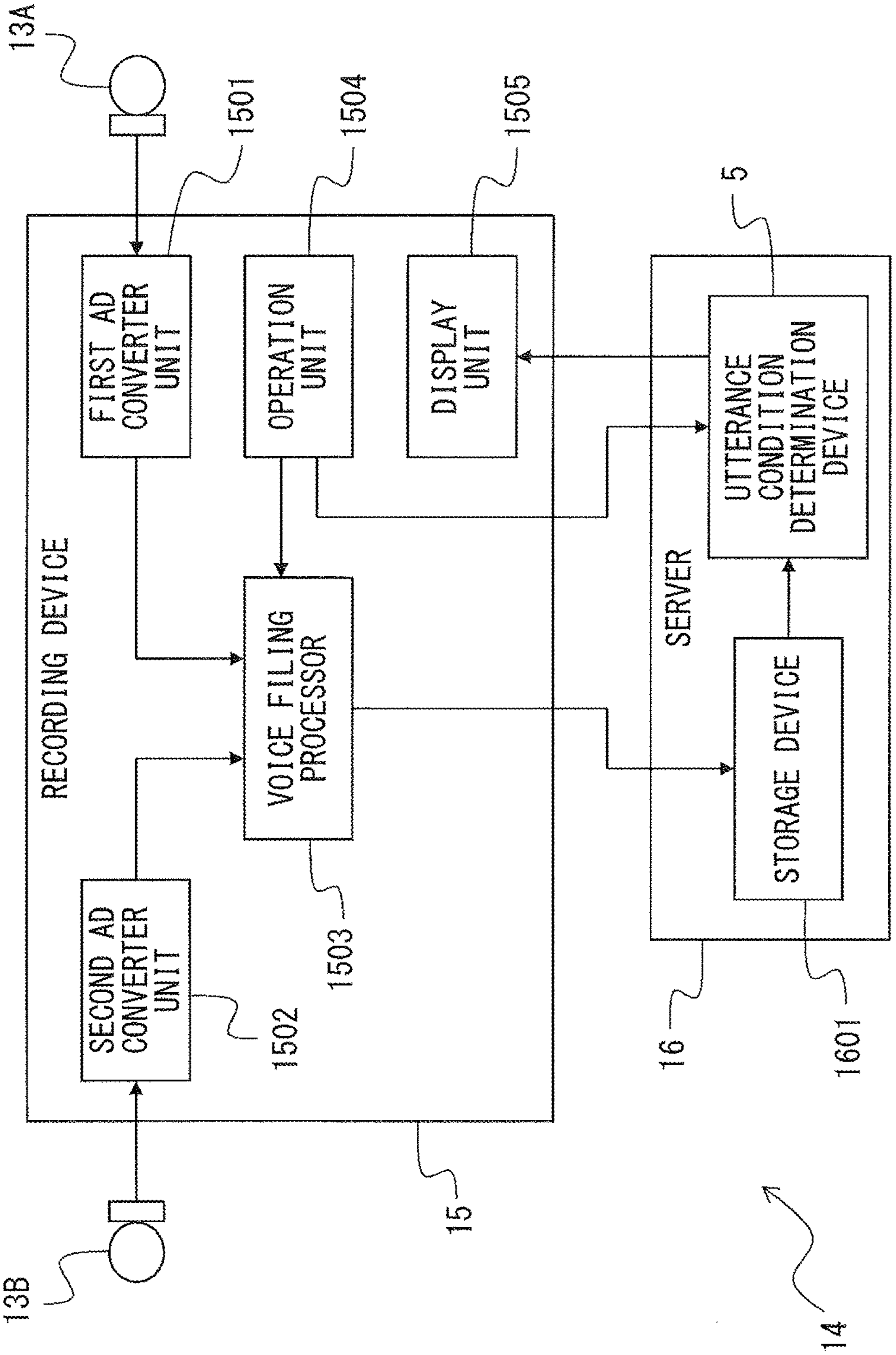
FIG. 23 is a diagram illustrating a functional configuration of a recording system according to Embodiment 5.

FIG. 23 is a diagram illustrating a functional configuration of a recording system according to Embodiment 5. As illustrated in FIG. 23, the recording system 14 according to the present embodiment includes the first microphone 13A, the second microphone 13B, a recording device 15, and a server 16. The recording device 15 and the server 16 are connected via a communication network such as the Internet as an example.

The recording device 15 includes the first AD converter unit 1501, the second AD converter unit 1502, a voice filing processor 1503, an operation unit 1504, and a display unit 1505.

The first AD converter unit 1501 converts a voice signal collected by the first microphone 13A from an analog signal to a digital signal. The second AD converter unit 1502 converts a voice signal collected by the second microphone 13B from an analog signal to a digital signal. In the following descriptions, the voice signal collected by the first microphone 13A is a voice signal of the first speaker and the voice signal collected by the second microphone 13B is a voice signal of the second speaker.

The voice filing processor unit 1503 generates an electronic file (a voice file) of the voice signal of the first speaker converted by the first AD converter unit 1501 and the voice signal of the second speaker converted by the second AD converter unit 1502. The voice filing processor unit 1503 stores the generated voice file in the storage device 1601 of the server 16.

The operation unit 1504 is a button switch etc. used for operating the recording device 15. For example, when an operator of the recording device 15 starts recording by operating the operation unit 1504, a start command of prescribed processing is input from the operation unit 1504 to the voice filing processor unit 1503. When the operator of the recording device 15 performs an operation to reproduce the recorded voice (a voice file stored in the storage device 1601) the recording device 15 reproduce the voice file read out from the storage device 1601 with a speaker that is not illustrated in the drawing. The recording device 15 also has the utterance condition determination device 5 determines the utterance condition of the second speaker at the time of reproducing the voice file.

The display unit 1505 displays the determination result (the satisfaction level of the second speaker) etc. of the utterance condition determination device 5.

Meanwhile, the server 16 includes a storage device 1601 and the utterance condition determination device 5. The storage device 1601 stores various data files including voice files generated in the voice filing processor unit 1503 of the recording device 15. The utterance condition determination device 5 determines the utterance condition (the satisfaction level) of the second speaker at the time of reproducing a voice file (a record of conversation between the first speaker and the second speaker) stored in the storage device 1601.

Figure 24:
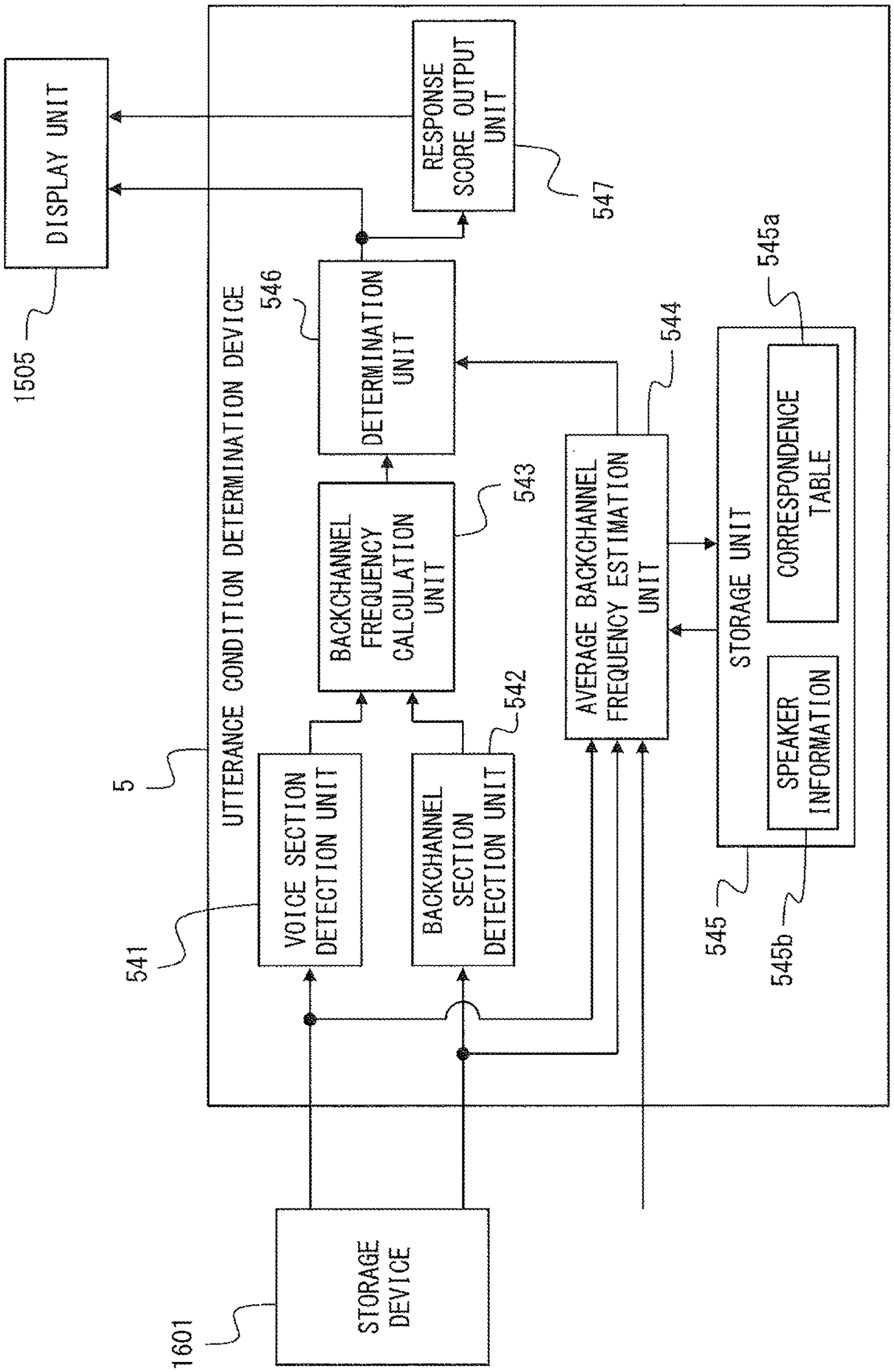
FIG. 24 is a diagram illustrating a functional configuration of the utterance condition determination device according to Embodiment 5.

FIG. 24 is a diagram illustrating a functional configuration of the utterance condition determination device according to Embodiment 5. As illustrated in FIG. 24, the utterance condition determination device 5 according to the present embodiment includes a voice section detection unit 541, a backchannel section detection unit 542, a backchannel frequency calculation unit 543, an average backchannel frequency estimation unit 544, and a storage unit 545. The utterance condition determination device 5 further includes a determination unit 546 and a response score output unit 547.

The voice section detection unit 541 detects a voice section in voice signals of the first speaker (voice signals collected by the first microphone 13A). Similarly to the voice section detection unit 501 of the utterance condition determination device 5 according to Embodiment 1, the voice section detection unit 541 detects a section in which the power obtained from a voice signal is at or above a certain threshold TH from among the voice signals of the first speaker as a voice section.

The backchannel section detection unit 542 detects a backchannel section in voice signals of the second speaker (voice signals collected by the second microphone 13B). Similarly to the backchannel section detection unit 502 of the utterance condition determination device 5 according to Embodiment 1, the backchannel section detection unit 542 performs morphological analysis of the voice signals of the second speaker and detects a section that matches any piece of backchannel data registered in a backchannel dictionary as a backchannel section.

The backchannel frequency calculation unit 543 calculates the number of times of backchannel feedbacks of the second speaker per speech duration of the first speaker as a backchannel frequency of the second speaker. The backchannel frequency calculation unit 543 sets a certain unit of time to be one frame and calculates the backchannel frequency based on the speech duration calculated from the voice section of the first speaker within a frame and the number of times of backchannel feedbacks calculated from the backchannel section of the second speaker. Similarly to Embodiment 1, the backchannel frequency calculation unit 543 in the utterance condition determination device 5 according to the present embodiment calculates a backchannel frequency IA(m) provided from the formula (4).

The average backchannel frequency estimation unit 544 estimates an average backchannel frequency of the second speaker. The average backchannel frequency estimation unit 544 calculates (estimates) an average of the backchannel frequency of the second speaker based on a voice section of the second speaker in a time period in which a prescribed number of frames have elapsed from the voice start time of the second speaker. The average backchannel frequency estimation unit 544 performs processing similar to the voice section detection unit 541 and detects a voice section in the voice signals of a prescribed number of frames (e.g., two frames) from the voice start time of the second speaker. The average backchannel frequency estimation unit 544 calculates a continuous speech duration $T_j$ and a cumulative speech duration $T_{all}$ of the second speaker from the start time $start_j'$ to the end time $end_j'$ of the detected voice section. The continuous speech duration $T_j$ and the cumulative speech duration $T_{all}$ are calculated from the following formulae (19) and (20), respectively.

$$T_j = end'_j - start'_j \tag{19}$$

$$T_{all} = \sum_j T_j \tag{20}$$

Furthermore, the average backchannel frequency estimation unit 544 calculates a time $T_{sum}$ provided from the following formula (21) by using the continuous speech duration $T_j$ and the cumulative speech duration $T_{all}$.

$$T_{sum} = \xi_1 \cdot T_j + \xi_2 \cdot T_{all} \tag{21}$$

In the formula (21), $\xi_1$ and $\xi_2$ are weighting coefficients and $\xi_1 = \xi_2 = 0.5$ is given as an example.

Afterwards, the average backchannel frequency estimation unit 544 calculates an average backchannel frequency JE corresponding to the calculated time $T_{sum}$ by referencing the correspondence table 545*a* of average backchannel frequency stored in the storage unit 545. Additionally, when a change is made to the speaker information $info_2(n)$ of the second speaker, the average backchannel frequency estimation unit 544 stores $info_2(n-1)$ and the average backchannel frequency JE in the speaker information list 545*b* of the storage unit 545. When a change is made to the speaker information $info_2(n)$ of the second speaker, the average backchannel frequency estimation unit 544 references the speaker information list 545*b* of the storage unit 545. When the changed speaker information $info_2(n)$ is on the speaker information list 545*b*, the average backchannel frequency estimation unit 544 reads out an average backchannel frequency JE corresponding to the changed speaker information $info_2(n)$ from the speaker information list 545*b* and output the average backchannel frequency JE to the determination unit 546. On the other hand, when the changed speaker information $info_2(n)$ is not on the speaker information list 545*b*, the average backchannel frequency estimation unit 544 uses a prescribed initial value $JE_0$ as an average backchannel frequency JE until a prescribed number of frames has elapsed and calculates an average backchannel frequency JE in the above-described manner when a prescribed number of frames has elapsed.

The determination unit 546 determines the satisfaction level of the second speaker, i.e., whether or not the second speaker is satisfied, based on the backchannel frequency IA(m) calculated in the backchannel frequency calculation unit 543 and the average bacchanal frequency JE calculated (estimated) in the average backchannel frequency estimation unit 544. The determination unit 546 outputs a determination result v(m) based on the criterion formula provided in the following formula (22).

$$v(m) = \begin{cases} 0 & (0 < IA(m) < \beta_1 \cdot JE) \\ 1 & (\beta_1 \cdot JE \leq IA(m) \leq \beta_2 \cdot JE) \\ 2 & (\beta_2 \cdot JE < IA(m)) \end{cases} \tag{22}$$

In the formula (22), $\beta_1$ and $\beta_2$ are correction coefficients and $\beta_1$=0.2 and $\beta_2$=1.5 are given as an example.

The determination unit 546 transmits the calculated determination result v(m) to the recording device 15, has the display unit 1505 of the recording device 15 display the determination result and outputs the determination result to the response score calculation unit 547.

The response score calculation unit 547 calculates a satisfaction level V of the second speaker throughout a conversation between the first and second speakers. This satisfaction level V is calculated by using the formula (14) provided in Embodiment 3 as an example. The response score calculation unit 547 transmits this overall satisfaction level V to the recording device 15 and has the display unit 1505 of the recording device 15 display the overall satisfaction level V.

FIG. 25 is a diagram providing an example of a correspondence table of an average backchannel frequency.

Although Embodiments 1 to 3 calculate an average backchannel frequency based on a backchannel frequency of the second speaker, the present embodiment calculates (estimates) an average backchannel frequency based on the speech duration (voice section) of the second speaker as described above. A speaker who has a longer speech duration tends to make backchannel feedbacks more frequently than a speaker who has a shorter speech duration. For that reason, as in a correspondence table **545*a* illustrated in FIG. 25**, for example, the average backchannel frequency JE is made greater as the time $T_{sum}$ that relates to the speech duration calculated by using the formulae (19) to (21) becomes longer. As a result, an average backchannel frequency JE that has a tendency similar to that of Embodiments 1 to 3 can be calculated.

Figure 26:
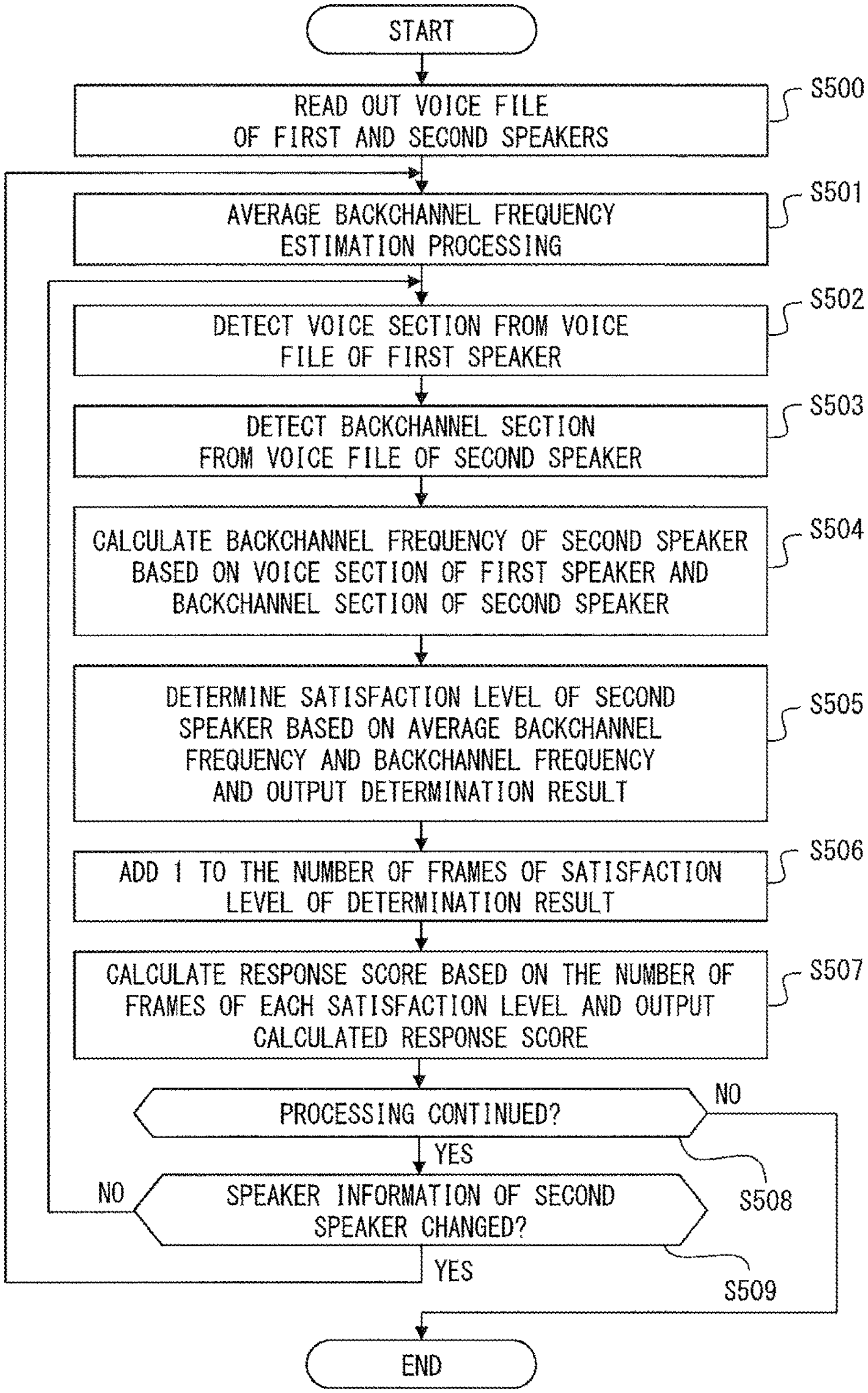
FIG. 26 is a flowchart providing details of processing performed by the utterance condition determination device according to Embodiment 5.

FIG. 26 is a flowchart providing details of processing performed by the utterance condition determination device according to Embodiment 5.

The utterance condition determination device 5 according to the present embodiment performs the processing provided in FIG. 26 when an operator operates the operation unit 1504 of the recording device 15 so that reproduction of a conversation record stored in the storage device 1601 is started.

The utterance condition determination device 5 reads out voice files of the first and second speakers (step S500). Step S500 is performed by a readout unit (not illustrated) provided in the utterance condition determination device 5. The readout unit in the utterance condition determination device 5 reads out voice files of the first and second speakers corresponding to a conversation record designated through the operation unit 1504 of the recording device 15 from the storage device 1601. The readout unit outputs a voice file of the first speaker to the voice section detection unit 541 and the average backchannel frequency estimation unit 544. The readout unit also outputs a voice file of the second speaker to the backchannel section detection unit 542 and the average backchannel frequency estimation unit 544.

Next, the utterance condition determination device performs the average backchannel frequency estimation processing (step S501). Step S501 is performed by the average backchannel frequency estimation unit 544. After detecting a voice section in the voice signals of two frames (60 seconds) from the voice start time of the second speaker, the average backchannel frequency estimation unit 544 calculates a time $T_{sum}$ by using the formulae (19) to (21). Afterwards, the average backchannel frequency estimation unit 544 references a correspondence table **545*a* of average backchannel frequency stored in the storage unit 545 and outputs to the determination unit 546** an average backchannel frequency JE corresponding to the calculated time $T_{sum}$ as an average backchannel frequency of the second speaker.

Next, the utterance condition determination device 5 performs processing to detect a voice section from the voice file of the first speaker (step S502) and processing to detect a backchannel section from the voice file of the second speaker. Step S502 is performed by the voice section detection unit 541. The voice section detection unit 541 calculates a detection result $u_1(L)$ of a voice section in the voice file of the first speaker by using the formulae (1) and (2). The voice section detection unit 541 outputs the voice section detection result $u_1(L)$ to the backchannel frequency calculation unit 543. Step S503 is performed by the backchannel section detection unit 542. The backchannel section detection unit 542, after detecting a backchannel section by the above-described morphological analysis etc., calculates the detection result $u_2(L)$ of the backchannel section by using the formula (3). The backchannel section detection unit 542 outputs the detection result $u_2(L)$ of the backchannel section to the backchannel frequency calculation unit 543.

Note that in the flowchart in FIG. 26, step S503 is performed after step S502, but this sequence is not limited. Therefore, step S503 may be performed before step S502. Also, step S502 and step S503 may be performed in parallel.

When the processing in step S502 and S503 is ended, the utterance condition determination device 5, next, calculates a backchannel frequency of the second speaker based on the voice section of the first speaker and the backchannel section of the second speaker (step S504). Step S504 is performed by the backchannel frequency calculation unit 543. The backchannel frequency calculation unit 543 calculates the backchannel frequency IA(m) provided from the formula (4) by using the detection result of the voice section and the detection result of the backchannel section in the mth frame as explained in Embodiment 1.

The utterance condition determination device 5, next, determines the satisfaction level of the second speaker based on the average backchannel frequency JE and the backchannel frequency IA(m) of the second speaker and outputs a determination result (step S505). Step S505 is performed by the determination unit 546. The determination unit 546 calculates a determination result v(m) by using the formula (22).

Next, the utterance condition determination device 5 adds 1 to the number of frames of the satisfaction level corresponding to the value of the calculated determination result v(m) (step S506). Step S506 is performed by the response score output unit 547. Here, the number of frames of the satisfaction level is $c_0$, $c_1$, and $c_2$ used in the formula (14). When the determination result v(m) is 0 as an example, 1 is added to a value of $c_0$ in step S506. When the determination result v(m) is 1 or 2, 1 is added to a value of $c_1$ or a value of $c_2$, respectively, in step S506.

The utterance condition determination device 5, next, calculates a response core of the first speaker based on the number of frames of the satisfaction level and outputs the calculated response score (step S507). Step S507 is performed by the response score output unit 547. In step S507, the response score output unit 547 calculates the satisfaction level V of the second speaker by using the formula (14), and this satisfaction level V becomes a response score of the first speaker. The response score output unit 547 also outputs the calculated satisfaction level V (a response score) to a speaker (not illustrated) of the recording device 15.

After calculating the response score, the utterance condition determination device 5 decides whether or not to continue the processing (step S508). When the processing is not continued (step S508; NO), the utterance condition determination device 5 ends the readout of the voice files of the first and second speakers and ends the processing.

On the other hand, when the processing is continue (step S508; YES), the utterance condition determination device 5, next, checks whether or not a change is made to speaker information of the second speaker (step S509). When no change has been made to speaker information $info_2(n)$ of the second speaker (step S509; NO), the utterance condition determination device 5 repeats the processing in step S502 and subsequent steps. When a change has been made to the speaker information $info_2(n)$ of the second speaker (step S509; YES), the utterance condition determination device 5 brings the processing back to step S501, calculates the average backchannel frequency JE for the changed second speaker and performs the processing in step S502 and subsequent steps.

As described above, Embodiment 5 uses an average JE of backchannel frequency calculated on the basis of a continuous speech duration $T_j$ and a cumulative speech duration $T_{all}$ of the second speaker as an average backchannel frequency. For that reason, even though the second speaker is, for example, a speaker who infrequently gives backchannel feedback by nature, the average backchannel frequency can be calculated appropriately and therefore whether or not the second speaker is satisfied can be determined.

Note that the utterance condition determination device 5 according to the present embodiment can be applied not only to the recording system 14 illustrated in FIG. 23, but also to the voice call system provided as an example in Embodiments 1 to 3.

In addition, the configuration of the utterance condition determination device 5 and the processing performed by the utterance condition determination device 5 are not limited to the configurations or the processing provided as an example in Embodiments 1 to 5.

The utterance condition determination device 5 provided as an example in Embodiments 1 to 5 can be realized by, for example, a computer and a program executed by the computer.

Figure 27:
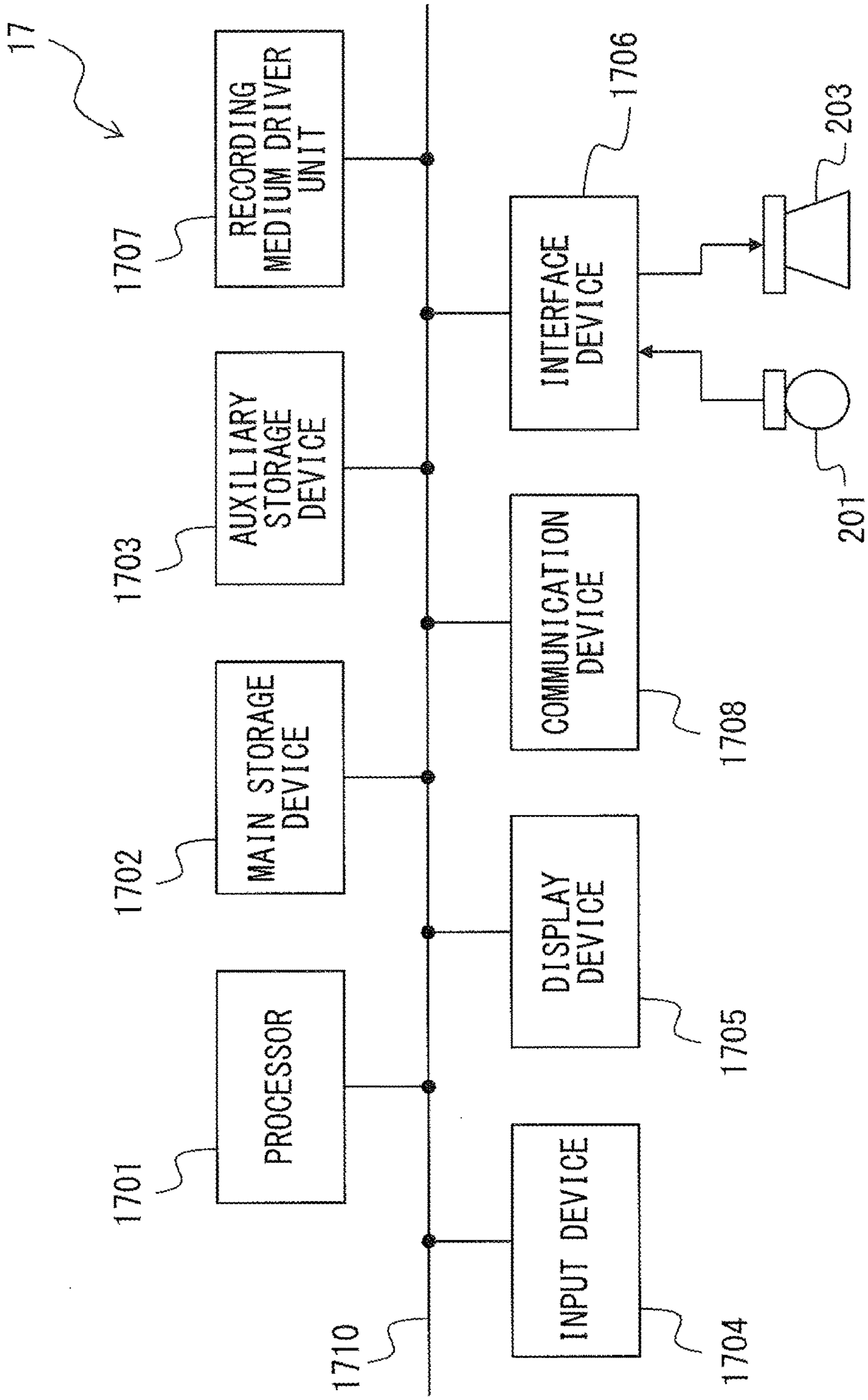
FIG. 27 is a diagram illustrating a hardware structure of a computer.

FIG. 27 is a diagram illustrating a hardware structure of a computer. As illustrated in FIG. 27, a computer 17 includes a processor 1701, a main storage device 1702, an auxiliary storage device 1703, an input device 1704, and a display device 1705. The computer 17 further includes an interface device 1706, a recording medium driver unit 1707, and a communication device 1708. These elements 1701 to 1708 in the computer 17 are connected with each other via a bus 1710 and data can be exchanged between the elements.

The processor 1701 is a processing unit such as Central Processing Unit (CPU) and controls the entire operations of a computer 9 by executing various programs including an operating system.

The main storage device 1702 includes a Read Only Memory (ROM) and a Random Access Memory (RAM). ROM in the main storage device 1702 records in advance prescribed basic control programs etc. that are read out by the processor 1701 at the time of startup of the computer 17, for example. RAM in the main storage device 1702 is used as a working storage area when necessary when the processor 1701 executes various programs. RAM in the main storage device 1702 can be used, for example, for temporary storage (retaining) of an average backchannel frequency that is an average of backchannel frequency etc., a voice section of the first speaker, and a backchannel section of the second speaker.

The auxiliary storage device 1703 is a high-capacity storage device such as a Hard Disk Drive (HDD) and Solid State Drive (SSD) with its capacity being larger compared with the main storage device 1702. The auxiliary storage device 1703 stores various programs executed by the processor 1701, various pieces of data and so forth. The programs stored in the auxiliary storage device 1703 include a program that causes the computer 17 to execute the processing illustrated in FIG. 4, and FIG. 5 and a program that causes the computer to execute the processing illustrated in FIG. 9 and FIG. 10 as an example. In addition, the auxiliary storage device 1703 can store a program that enables a voice call between the computer 17 and another phone set (or another computer) as an example and a program that generates a voice file from voice signals. Data stored in the auxiliary storage device 1703 includes electronic files of voice calls, determination results of the satisfaction level of the second speaker and so forth.

The input device 1704 is, for example, a keyboard device or a mouse device, and when an operator of the computer 17 operates the input device 1704, input information associated with the content of the operation is transmitted to the processor 1701.

The display device 1705 is a liquid crystal display as an example. The liquid crystal display displays various texts, images, etc. in accordance with display data transmitted from the processor 1701 and so forth.

The interface device 1706 is, for example, an input/output device to connect electronic devices such as a microphone 201 and a receiver (speaker) 203 to the computer 17.

The recording medium driver unit 1707 is a device to read out programs and data recorded in a portable recording medium that is not illustrated in the drawing and to write data etc. stored in the auxiliary storage device 1703 in the portable recording medium. A flash memory having a Universal Serial Bus (USB) connector, for example, can be used as the portable recording medium. Additionally, optical discs such as Compact Disc (CD), Digital Versatile Disc (DVD), and Blu-ray Disc (Blu-ray is a trademark) can be used as the portable recording medium.

The communication device 1708 is a device that can communicate with the computer 17 and other computers etc. or that can connect the computer 17 and other computers etc. so as to be able to communicate with each other through a communication network such as the Internet.

The computer 17 can work as the voice call processor unit 202 and the display unit 204 in the first phone set 3 and the utterance condition determination device 5, for example, illustrated in FIG. 1. In such a case, for example, the computer 17 reads out a program for making a voice call using the IP network 4 from the auxiliary storage device 1703 and executes the program in advance, and stands ready to make a call connection with the second phone set 3. When a call connection between the computer 17 and the second phone set 3 is established by a control signal from the second phone set 3, the processor 1701 executes a program to perform the processing illustrated in FIG. 4 and FIG. 5 and performs the processing related to an voice call as well as the processing to determine the satisfaction level of the second speaker.

Furthermore, it is possible to cause the computer 17 to execute the processing to generate voice files from the voice signals of the first and second speakers for each voice call, as an example. The generated voice files may be stored in the auxiliary storage device 1703 or may be stored in the portable recording medium though the recording medium driver unit 1707. Moreover, the generated voice files can be transmitted to other computers connected through the communication device 1708 and the communication network.

Note that the computer 17 operated as the utterance condition determination device 5 does not need to include all of the elements illustrated in FIG. 27, but some elements (e.g., the recording medium drive unit 1707) can be omitted depending on the intended use or conditions. In addition, the computer 17 is not limited to a multipurpose type that can realize multiple functions by executing various programs, but a device that specializes in determining the satisfaction level of a specific speaker (the second speaker) in a voice call or a conversation may also be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An utterance condition determination device comprising:
- a first memory configured to store a voice signal of a first speaker and a voice signal of a second speaker;
- a second memory configured to store a plurality of pieces of information each corresponding to a satisfaction level of the second speaker; and
- a processor configured
  - to estimate an average backchannel frequency that represents a backchannel frequency of the second speaker in a period of time from a voice start time of the voice signal of the second speaker to a predetermined time based on the voice signal of the first speaker and the voice signal of the second speaker,
  - to calculate a backchannel frequency of the second speaker for each unit of time based on the voice signal of the first speaker and the voice signal of the second speaker,
  - to determine a satisfaction level of the second speaker based on the estimated average backchannel frequency and the calculated backchannel frequency,
  - to select one of the plurality of pieces of information stored in the second memory using the determined satisfaction level, and
  - to output the selected one of the plurality of pieces of information.

2. The utterance condition determination device according to claim 1, wherein
- the processor estimates the average backchannel frequency based on a number of times of backchannel feedback of the second speaker in a period of time from the voice start time of the voice signal of the second speaker to the predetermined time.

3. The utterance condition determination device according to claim 1, wherein
- the processor estimates the average backchannel frequency based on the backchannel frequency from a voice start time of the voice signal of the second speaker to an end time.

4. The utterance condition determination device according to claim 1, wherein
- the processor estimates the average backchannel frequency based on an speech rate calculated from the voice signal of the second speaker.

5. The utterance condition determination device according to claim 1, wherein
- the processor calculates an speech duration of the second speaker by using an speech duration obtained from a start time and an end time of a voice section in the voice signal of the second speaker and estimates the average backchannel frequency based on the calculated speech duration.

6. The utterance condition determination device according to claim 1, wherein
- the processor calculates a cumulative speech duration in the voice signal of the second speaker and estimates the average backchannel frequency in accordance with the cumulative speech duration of the second speaker.

7. The utterance condition determination device according to claim 1, wherein
- the processor restores the average backchannel frequency to a predetermined value when a change is made to speaker information of the second speaker and estimates the average backchannel frequency of the second speaker after the change.

8. The utterance condition determination device according to claim 7, wherein
- the first memory further stores the speaker information of the second speaker and the average backchannel frequency of the second speaker in association with each other, and
- the processor references the first memory when a change is made to the speaker information of the second speaker and reads out the speaker information of the second speaker from the first memory when speaker information after the change is stored in the first memory.

9. The utterance condition determination device according to claim 1, wherein
- the processor detects a voice section included in the voice signal of the first speaker, detects a backchannel section included in the voice signal of the second speaker, and calculates a number of times of backchannel feedback of the second speaker for an speech duration of the first speaker based on the detected voice section and the detected backchannel section.

10. The utterance condition determination device according to claim 1, wherein
- the first memory further stores a sorting of backchannel feedback in accordance with an acoustic feature amount in a backchannel section of the second speaker, and
- the processor calculates the acoustic feature amount of the backchannel section of the second speaker and calculates the backchannel frequency of the second speaker based on the calculated feature amount and the sorting of backchannel feedback.

11. The utterance condition determination device according to claim 1, wherein the processor calculates an speech duration from a start time and an end time of a voice section in the voice signal of the first speaker, calculates a number of times of backchannel feedback from a backchannel section in the voice signal of the second speaker, and further calculates the number of times of backchannel feedback per the speech duration as the backchannel frequency.

12. The utterance condition determination device according to claim 1, wherein the processor calculates an speech duration from a start time and an end time of a voice section in the voice signal of the first speaker, calculates a number of times of backchannel feedback from a backchannel section of the voice signal of the second speaker detected between the start time and the end time of the voice section of the voice signal of the first speaker, and further calculates the number of times of backchannel feedback per the speech duration as the backchannel frequency.

13. The utterance condition determination device according to claim 1, wherein the processor calculates an speech duration from a start time and an end time of a voice section in the voice signal of the first speaker, calculates a number of times of backchannel feedback from a backchannel section of the voice signal of the second speaker detected between the start time and the end time of the voice section of the voice signal of the first speaker and within a predetermined time period immediately after the voice section that is set in advance, and further calculates the number of times of backchannel feedback per the speech duration as the backchannel frequency.

14. The utterance condition determination device according to claim 1, wherein the processor further outputs a warning signal when the satisfaction level of the second speaker is a value that represents dissatisfaction.

15. The utterance condition determination device according to claim 1, wherein the processor further outputs a sentence in accordance with the satisfaction level of the second speaker.

16. The utterance condition determination device according to claim 1, wherein the processor further calculate a satisfaction level throughout the voice signal of the second speaker from the satisfaction level of the second speaker.

17. The utterance condition determination device according to claim 1, wherein the processor calculates and outputs a response score of the first speaker from the satisfaction level of the second speaker.

18. An utterance condition determination method, comprising:

estimating by a computer an average backchannel frequency that represents a backchannel frequency of a second speaker in a period of time from a voice start time of a voice signal of the second speaker to a predetermined time based on a voice signal of a first speaker and the voice signal of the second speaker;

calculating, by the computer, a backchannel frequency of the second speaker for each unit of time based on the voice signal of the first speaker and the voice signal of the second speaker;

determining by the computer a satisfaction level of the second speaker based on the estimated average backchannel frequency and the calculated backchannel frequency;

selecting by the computer one of a plurality of pieces of information stored in a memory using the determined satisfaction level, the plurality of pieces of information each corresponding to each satisfaction level of the second speaker, and outputting by the computer the selected one of the plurality of pieces of information.

19. A non-transitory computer-readable recording medium having stored therein a program for causing a computer to execute a process for determining an utterance condition, the process comprising:

estimating an average backchannel frequency that represents a backchannel frequency of a second speaker in a period of time from a voice start time of a voice signal of the second speaker to a predetermined time based on a voice signal of a first speaker and the voice signal of the second speaker;

calculating a backchannel frequency of the second speaker for each unit of time based on the voice signal of the first speaker and the voice signal of the second speaker;

determining a satisfaction level of the second speaker based on the estimated average backchannel frequency and the calculated backchannel frequency;

selecting by the computer one of a plurality of pieces of information stored in a memory using the determined satisfaction level, the plurality of pieces of information each corresponding to each satisfaction level of the second speaker, and outputting by the computer the selected one of the plurality of pieces of information.

* * * * *